United States Patent [19]
Yamamoto et al.

[11] Patent Number: 5,958,078
[45] Date of Patent: Sep. 28, 1999

[54] STORAGE UNIT AND STORAGE UNIT SUBSYSTEM

[75] Inventors: Akira Yamamoto; Yasutomo Yamamoto, both of Sagamihara; Manabu Kitamura, Ebina; Takao Satoh, Odawara, all of Japan

[73] Assignee: Hitachi, Ltd., Tokyo, Japan

[21] Appl. No.: 08/797,606

[22] Filed: Feb. 7, 1997

[30] Foreign Application Priority Data

Feb. 28, 1996 [JP] Japan .................................. 8-040945

[51] Int. Cl.⁶ .................................................. G06F 11/00
[52] U.S. Cl. ............................................................ 714/766
[58] Field of Search ................................. 371/40.4, 40.2, 371/40.15; 395/182.04, 182.05, 200.31, 200.81; 711/122

[56] References Cited

U.S. PATENT DOCUMENTS 5,734,812   3/1998   Yamamoto et al. .................... 395/182
5,787,459   5/1998   Stallmo et al. ......................... 395/200

*Primary Examiner*—Vincent P. Canney
*Attorney, Agent, or Firm*—Antonelli, Terry, Stout & Kraus, LLP

[57] ABSTRACT

An intermediate value derived from old and new data record values or old and new data themselves are sent from a control unit to a disk unit which stores a parity record as information necessary for updating parity. The disk unit reads an old parity record and generates a new value of parity record based on the read old parity and the information received from the control unit. The generated new value is stored in an empty record on the storage medium to which a read/write head is first positioned after the generation of the new value and in which effective data has not been stored. In a disk array system, a time required to update the parity record due to the updating of the data record is reduced and a performance of the storage unit subsystem is improved.

34 Claims, 37 Drawing Sheets

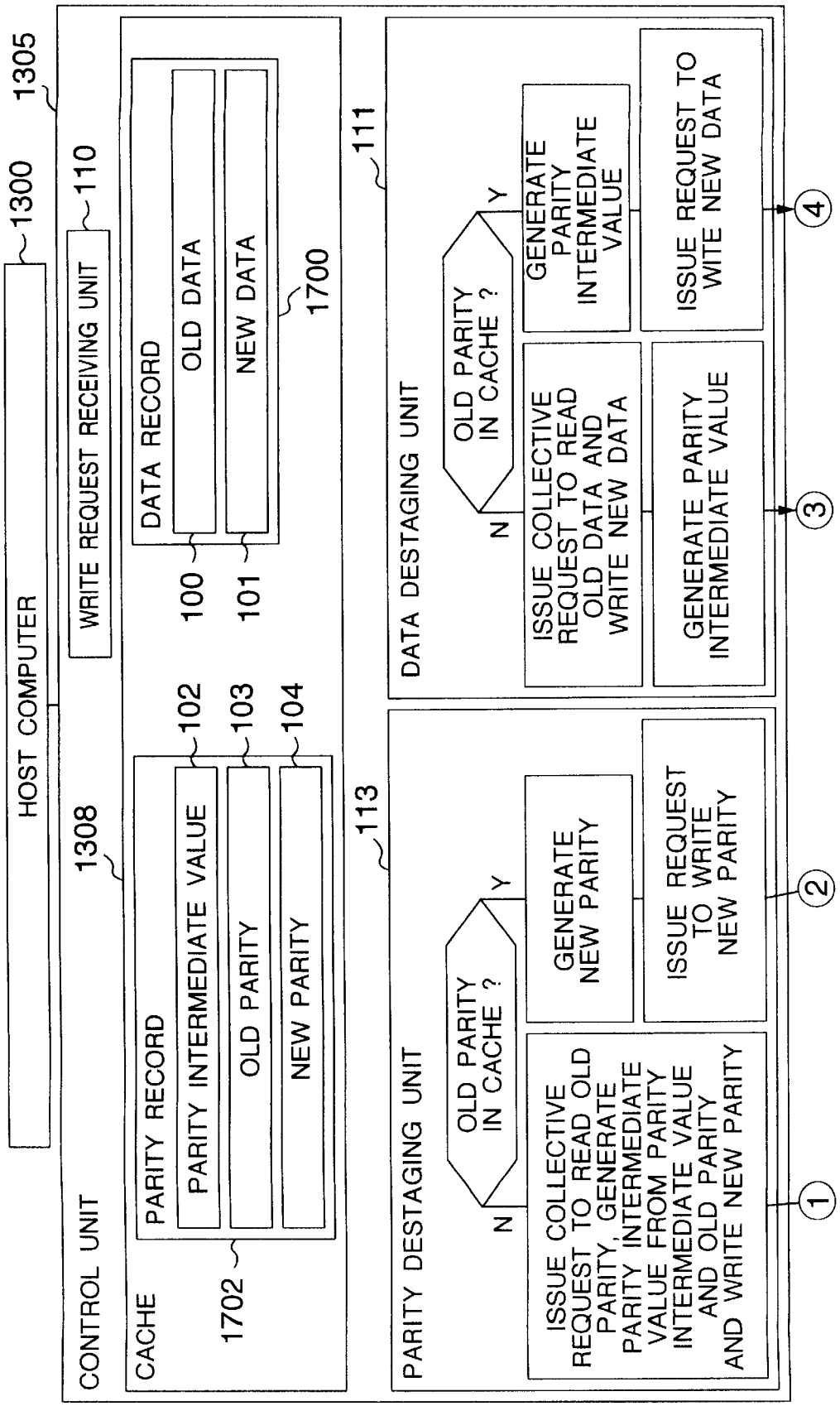

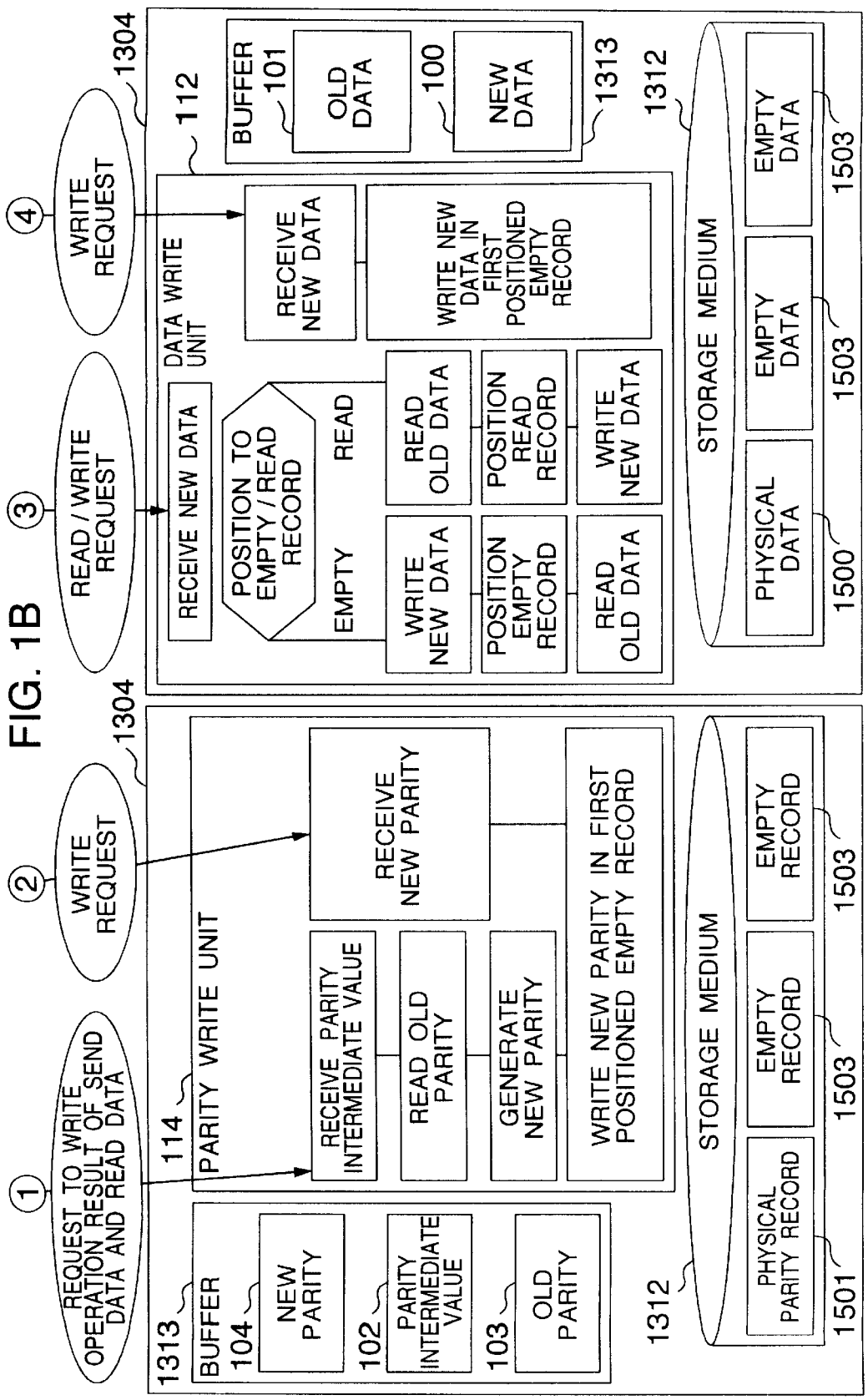

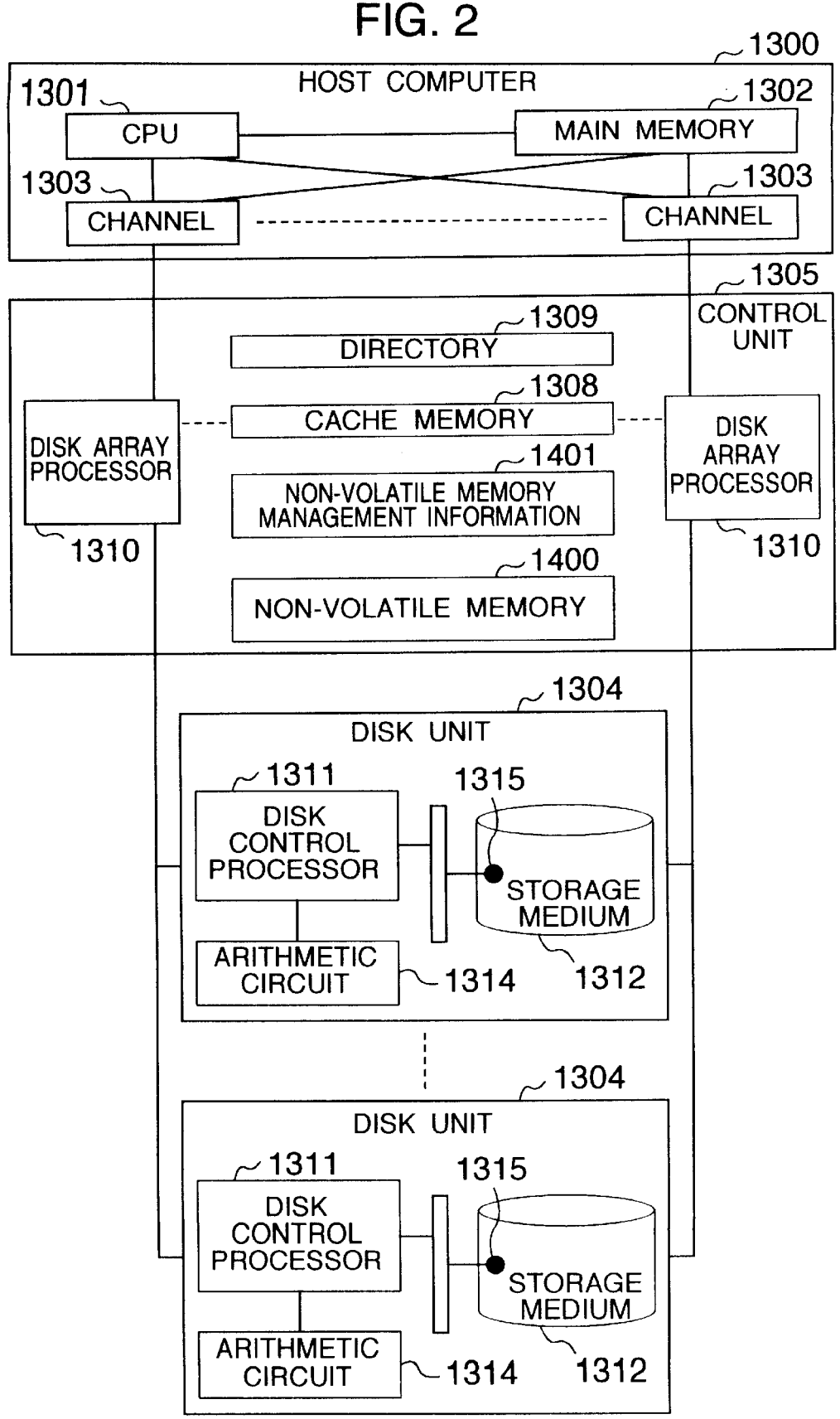

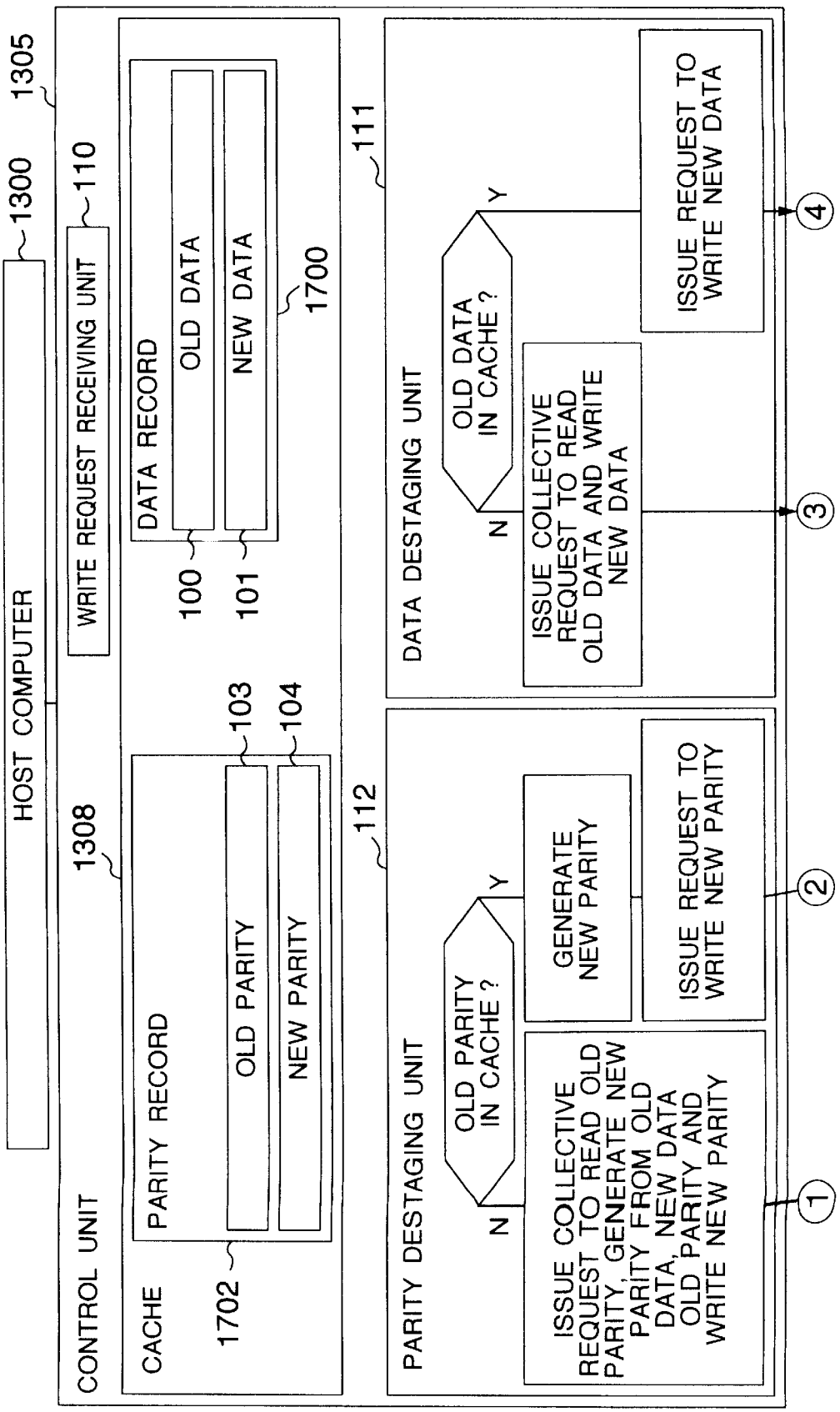

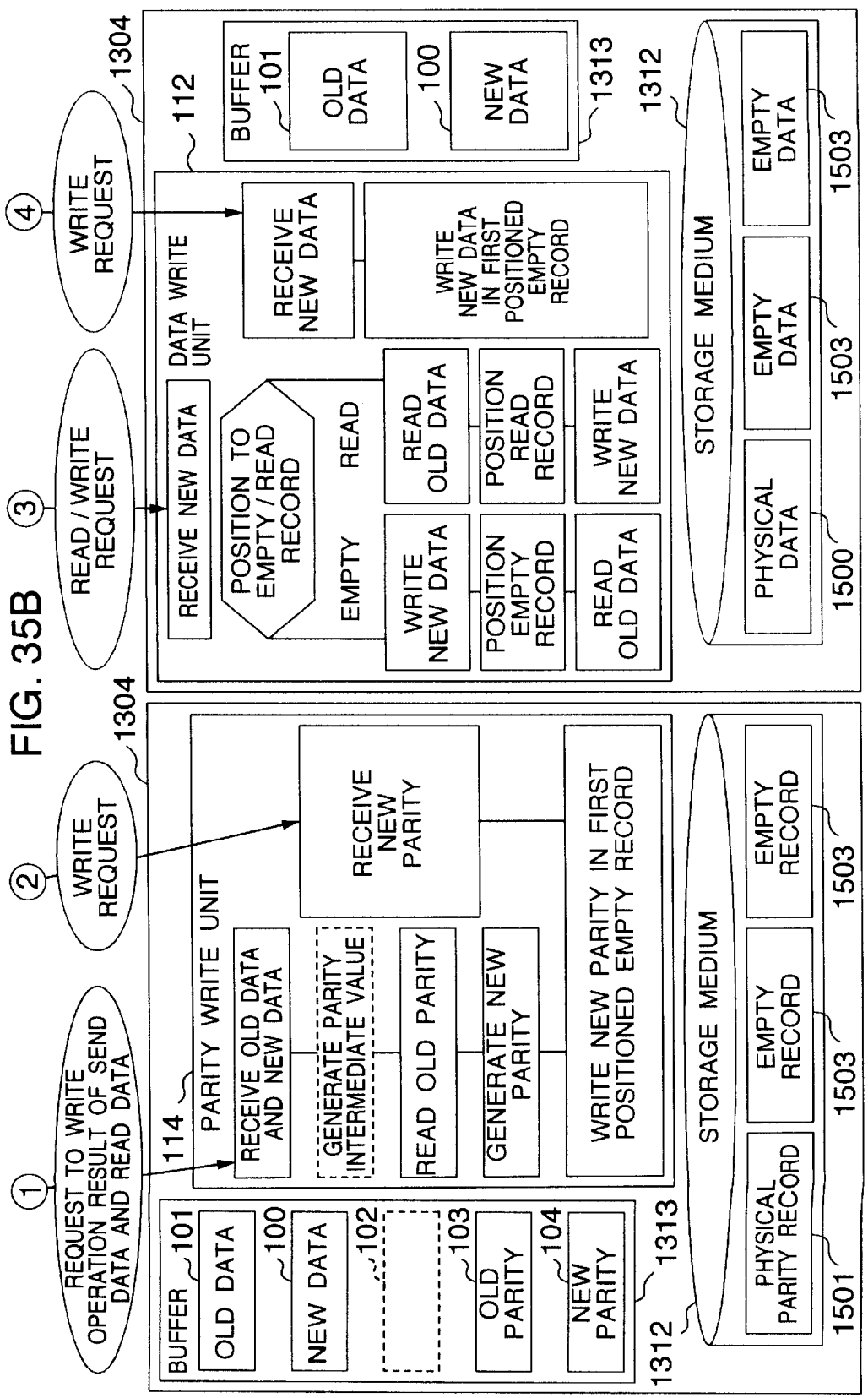

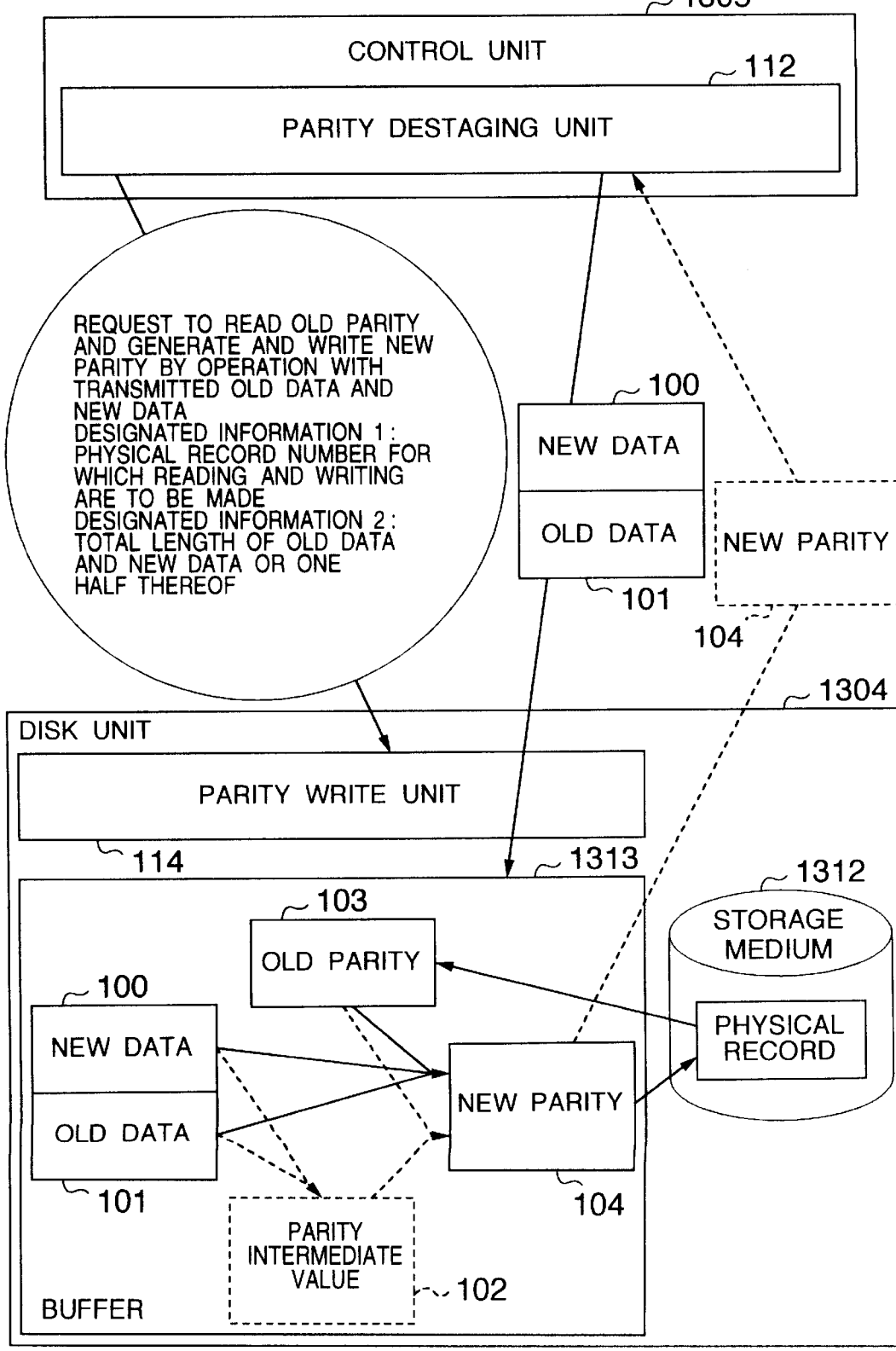

STORAGE UNIT AND STORAGE UNIT SUBSYSTEM

BACKGROUND OF THE INVENTION

The present invention relates to a storage unit subsystem in a computer system, and more particularly to the realization of high performance and high reliability of a storage unit subsystem having a cache memory.

As one of storage unit subsystems used in a computer system, a disk system which uses a magnetic disk as a storage medium has been used. As a technique to realize the high performance and the high reliability of such a disk system, a disk array system disclosed in D. Patterson et al: A Case for Redundant Arrays of Inexpensive Disks (RAID), ACMSIGMOD conference proceedings, Chicago, Ill., Jun. 1–3, 1988, pp. 109–116, (hereinafter referred to as a Patterson's article) has been known. In the disk array system, one logical disk unit to a host computer is realized as a plurality of physical disk units to attain the high performance. Further, redundant data which allows the recovery of data stored in a disk unit in which a fault has occurred when such a fault occurs in the disk unit storing that data is stored in a different disk unit from the disk unit in which the data is stored to attain the high reliability.

The Patterson's article discloses several techniques to be described below as to a method for arranging redundant data on the disk array system. In a first data arrangement method, data of totally identical content are stored in two disk units and it is called RAID1 or dual writing. In a second data arrangement method, a record which is a set off data which is a read/write unit when a host unit conducts a read/write process with a logical disk unit is divided and stored into a plurality of disk units. This data arrangement method is called RAID3. In the RAID3, redundant data are generated from respective dividends divided from the record. Further, in a third data arrangement method, the record is not divided as it is in the RAID3 but one record is stored in one disk unit and redundant data is generated from a plurality of records stored in separate disk units. Such a data arrangement method includes methods called RAID4 and RAID5.

A record which stores data directly read and written by a host computer is usually called a data record, and a record which stores redundant data is usually called a parity record. A unit by which data is arranged in the disk unit is switched from one disk unit to another. This unit is called a stripe. A stripe is a set of records and a stripe comprising data records is called a data stripe and a stripe comprising parity records is called a parity stripe. Usually, in the disk array system, n (not smaller than 1) parity stripes are generated from m (not smaller than 1) data stripes. A set of m+n stripes is hereinafter called a parity group. Each of the m+n stripes is stored in separate disk units. When the number of parity stripes in the parity group is n, data in up to n disk units may be recovered even if faults occur in those disk units.

When a data record is updated, a parity record must also be updated accordingly. For example, only one data record in a parity group is updated, a new value of the parity record may be generated from a content of updating, an old value of the data record and an old value of the parity record. As a technique to efficiently conduct the update process of the parity record to realize the high performance of the system, the following techniques have been known.

For example, in a technique disclosed in JP-A-4-245342, the updating process to the data record is executed on a cache and the generation of a new value of the parity record and the writing of the data record and the parity record into the disk units are executed later. When write processes occur to data records in one parity group before the start of the generation of the new value of the parity record, the generation processing of the new values of the parity records corresponding to the plurality of write processes are collectively executed so that the high performance is attained.

PCT WO 91/20025 discloses a technique of dynamic mapping to efficiently executing a write process in the disk array. In this technique, when a write process occurs, a location on a disk unit at which the data record thereof is to be written is altered. Specifically, a parity group is formed by only written data, parity data is generated from those data and it is written into a disk of the disk array. In order to execute the above process, however, it is necessary that a data stripe of entire parity group is an empty area.

On the other hand, Technical Research Report of the Institute of Electronics, Information and Communication Engineers, DE93-45 "Evaluation of Performance of RAID5 Disk Arrays with Virtual Striping", by Mogi et al, September 1993, Technical Report Vol. 25, No. 251, pp. 69–75 (hereafter referred to as a Mogi's article) discloses more efficient technique. In the article, a location on a disk of a parity group itself is dynamically altered so that a data stripe of an entire parity group can be made empty more efficiently.

Further, JP-A-5-46324 discloses a technique to transfer information necessary for the updating of a parity record to a disk unit in which the parity record is stored and generate a new value of the parity record in the disk unit so that the number of times of data transfer between a control unit and the disk unit which occurs when the data is to be updated is reduced and the high performance of the disk array system is attained.

On the other hand, JP-A-4-230512 discloses a technique to secure empty records in the data stripe and the parity stripe on the disk unit at an appropriate proportion and write a new value of the parity record into the empty area rather than the original location to reduce a write time. The empty area described here is different one from those disclosed in PCT WO 91/20025 and the Mogi's article. In the technique disclosed in JP-A-4-230512, when the new values of the parity record and the data record are written after the completion of the generation of the new value of the parity record, they are written into the empty area rather than the original location. Thus, the original storage location of the parity record becomes empty. On the other hand, in the techniques disclosed in PCT WO 91/20025 and the Mogi's article, the new parity group is formed by only the new write data for the area in which the entire parity group is empty, and the entire parity group is written into the disk unit. The location at which the data was originally stored is managed as an empty area. Accordingly, there are following two essential differences between those techniques:

(1) In the technique disclosed in JP-A-4-230512, the selection of the empty area is made after the generation of the new value of the parity record but in the technique disclosed in PCT WO 91/20025 or the Mogi's article, a particular location on the disk unit at which the data is written is determined before the generation of the new value of the parity record, that is, when the parity group to be written is selected.

(2) In the technique disclosed in JP-A-4-230512, the data records and the parity records in one parity group do not change. On the other hand, in the technique disclosed in PCT WO 91/20025 or the Mogi's article, a set of data records in one parity group dynamically change.

In the technique disclosed in JP-A-4-230512, the control unit which controls the disk array issues to the disk unit a total of four requests, a data record read request, a data record write request, a parity record read request and a parity record write request. The control unit further generates the new value of the parity record. For example, it is assumed that the reading of an old parity record from a storage medium is completed in a disk unit while an old data record and a new data record are prepared in the control unit. As a matter of course, the disk unit attempts to send the old parity record read from the storage medium. However, a data transfer path between the control unit and the disk unit is usually shared by other disk units and it may happen that the data transfer path is occupied and a process to send the old parity record is not immediately started. Further, since the control unit may be executing other jobs, a lot of time from the receiving of old parity record till the start of the generation of the new value of the parity record may be required. Moreover, to send the new value of the parity record to the disk unit after the completion of the generation of the new value, the control unit need secure common resources for example the disk unit or the data transfer path. If a conflict happens, the control unit requires a waiting time.

It is thus seen that the method of generating the new value of the parity record in the control unit and sending the new value to the disk unit may require a considerable time from the reading of the old vale to the writing of the new value. Thus, even if an empty record is present immediately after the old value, the read/write head of a disk unit passes over the empty record before the new value is sent to the disk unit and the improvement of the performance is difficult to attain. Thus, in the technique of JP-A-4-230512, even if an area immediately following to the read area is an empty area, it is, in principle, substantially difficult to write the new value of the data record in that empty area.

On the other hand, in the technique disclosed in JP-A-5-46324, the disk unit is provided with a function to generate the new value of the parity record so that a load of the control unit may be distributed to the disk unit in some extent. However, it still involves a problem in reducing the load of the control unit. Further, since the new value of the parity record is written into a location from which the old value is read, a time of one disk rotation, at minimum, is required from the reading of the old value to the writing of the new value.

SUMMARY OF THE INVENTION

It is an object of the present invention to reduce a time from the reading of an old value to the writing of a new value in updating a parity record to improve the performance of a storage unit subsystem.

It is another object of the present invention to reduce a load of a control unit due to the updating of a parity record.

In order to achieve the above objects, in a storage unit subsystem of the present invention, a control unit sends to a disk unit an intermediate value for acquiring a new value of a parity record generated from an old data record and a new data record. The disk unit reads the old parity record and generates generates the new parity record from the intermediate value received from the control unit and the old parity record. In the disk unit, the process can be immediately executed because of no conflict of resources. Further, if an empty area is present after the generation of the new value of the parity record, the generated new value of the parity record is written into that area. Specifically, for example, a circuit for generating the new value of the parity record while reading the parity record is provided in the disk unit. Thus, the writing may be made to an area immediately following to the area from which the old parity record is read and the time from the reading of the old value to the writing of the new value may be reduced.

On the other hand, as for the data record, the control unit sends the new value of the data record to the disk unit. The disk unit reads the old data record and writes the new value of the data record into an empty area. Again, in this case, since there is no conflicting resource, the new value of the data record can be written in an area immediately following the area from which the data is read, if that area is empty. Accordingly, in this case, again, the time from the reading of the old value to the writing of the new value may be reduced.

In this manner, by executing the process necessary after the reading of the old value and before the writing of the new value in the disk unit, the new value may be written in a very short time.

Further, in order to achieve the another object, the storage unit subsystem of the present invention sends the old data together with the new data of the data record to the disk unit which stores the parity record when the control unit receives a write request from the host computer. The disk unit which stores the parity record reads the old parity record and generates the new value of the parity record from the old data and the new data received from the control unit and the old parity record which it reads.

In this manner, by transferring the old and new data from the control unit to the disk unit which stores the parity record and generating the new value of the parity record in the disk unit, the load of the control unit is reduced.

BRIEF DESCRIPTION OF THE DRAWINGS

FIGS. 1A and 1B show a functional block diagram representing an outline of a storage unit subsystem in accordance with a first embodiment, FIG. 2 shows a block diagram of a configuration of a computer system in accordance with the first embodiment, FIGS. 35A and 35B show functional block diagrams representing other functions of the storage unit subsystem, FIG. 39 shows a process conceptual view when the control unit 1305 sends the new data 100 and the old data to the disk unit 1304 and the disk unit 1304 stores the parity record 1702 in one and same physical record 1502.

DETAILED DESCRIPTION OF THE PREFERRED EMBODIMENTS

The embodiments of the present invention are now explained with reference to the drawings.

FIG. 2 shows a block diagram of a configuration in one embodiment of the computer system of the present invention. The computer system comprises a host computer 1300, a control unit 1305 and a plurality of disk units 1304. The host computer 1300 comprises a CPU 1301, a main memory 1302 and a channel 1303. The control unit 1305 executes a transfer process between the host computer 1300 and the disk unit 1304 in accordance with a read/write request from the host computer 1300. The control unit 1305 comprises one or more disk array processor 1310, a cache memory (hereinafter simply referred to as a cache) 1308, a directory 1309, a non-volatile memory 1400 and non-volatile memory management information 1401. The cache 1308 stores data of high access frequency among the data in the disk unit 1304. The directory 1309 stores management information for the cache 1308. The non-volatile memory 1400 is a non-volatile medium and stores data of high access frequency among the data in the disk unit, as does the cache 1308. The non-volatile memory management information 1401 is also non-volatile medium and stores the management information for the non-volatile memory 1400. The cache 1308 and the directory 1309 may be non-volatile. The control unit 1305 may not include the non-volatile memory 1400 and the non-volatile management information 1401. The disk array control processor receives a read/write request from the host computer in the control unit and executes a transfer process of data between the host computer 1300 and the disk unit 1304 by utilizing the cache 1308.

The control unit 1305 completes the write request from the host computer 1300 at the stage of storing data into the cache 1308 or the cache 1308 and the non-volatile memory 1400. The wiring of the data to the disk unit 1304 is executed later by the control unit 1305. This process is called a write-after process.

The disk unit 1304 comprises a disk control processor 1311, a storage medium 1312, an arithmetic circuit 1314 and a read/write head 1315. The disk control processor 1311 controls the data transfer between the storage medium 1312 and the control unit 1305 by utilizing the read/write head 1315. The buffer 1313 stores the data to be transferred between the storage medium 1312 and the control unit 1305. The arithmetic circuit 1314 is used to apply a predetermined arithmetic operation to the data read from the storage medium 1312. By executing the arithmetic operation by the disk control processor 1311, the arithmetic circuit 1314 may be eliminated.

Figure 3:
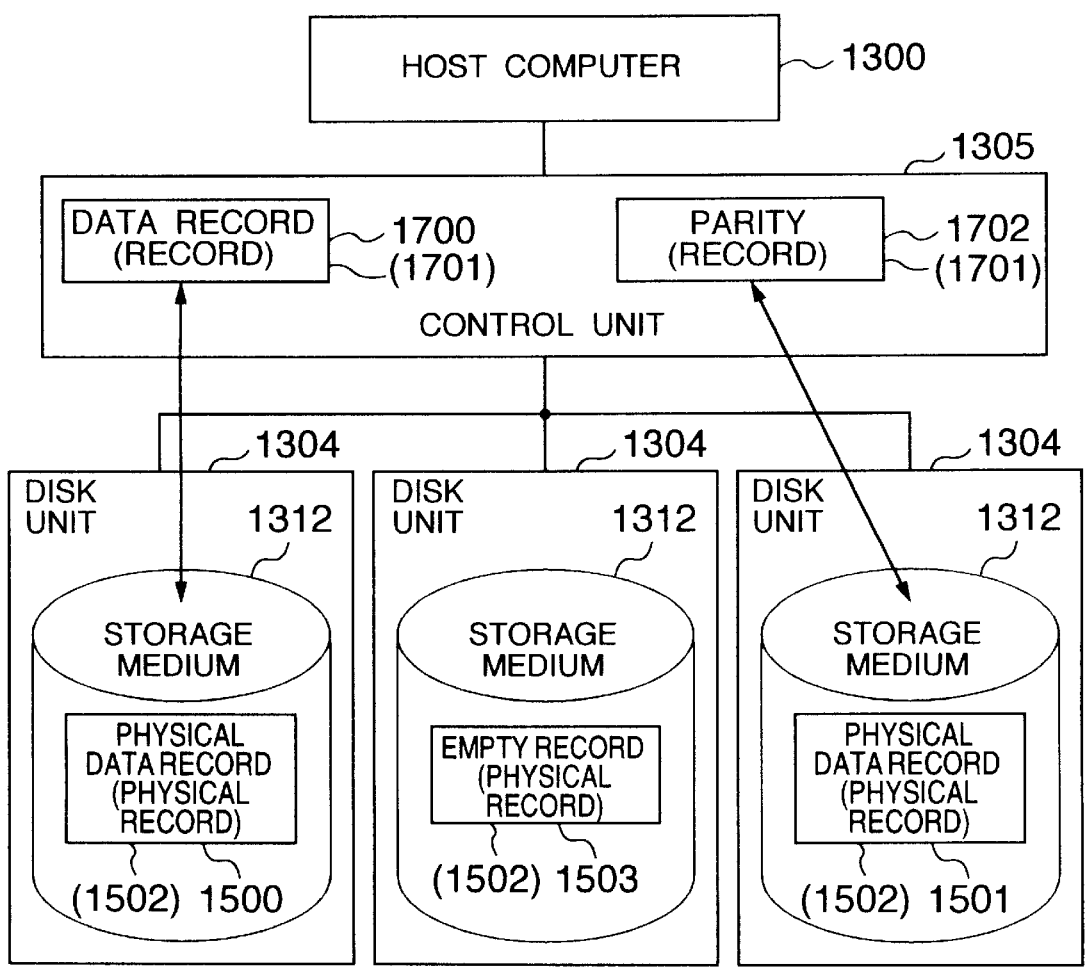
FIG. 3 shows a conceptual view for illustrating a concept of a record in the first embodiment.

A unit of data read or written between the host computer 1300 and the disk unit 1304 is usually called a record 1701. FIG. 3 summarizes a concept of the record 1701 in the present embodiment. A record which the host computer 1300 reads and writes with the control unit is called a data record 1700. On the other hand, a parity record 1702 is a record used for a process to recover a content of the data record 1700 when a fault occurs in the disk unit 1304 and the content of the data record 1700 is lost. In this case, when the value of the data record 1700 is changed, the content of the parity record 1702 must also changed accordingly. It is assumed here that n parity records 1702 are generated from m data records 1700. Thus, even if n data records are lost, they may be recovered.

A record 1701 stored on the disk unit 1304 is called a physical record 1502. In the present embodiment, physical records 1502 stored on the disk unit 1304 include three types of records, a physical data record 1500, a physical parity record 1501 and an empty record 1503. The physical data record 1500 is a physical record 1502 which stores the content of the data record 1700. On the other hand, the physical parity record 1501 stores the content of the parity record 1702. In the empty record 1502, neither the content of the data record 1700 nor the content of the parity record 1702 is stored. In the present embodiment, in order to improve the performance, an empty area is needed in the disk unit 1304. The empty record 1503 is a physical record to be used for that purpose.

Figure 4:
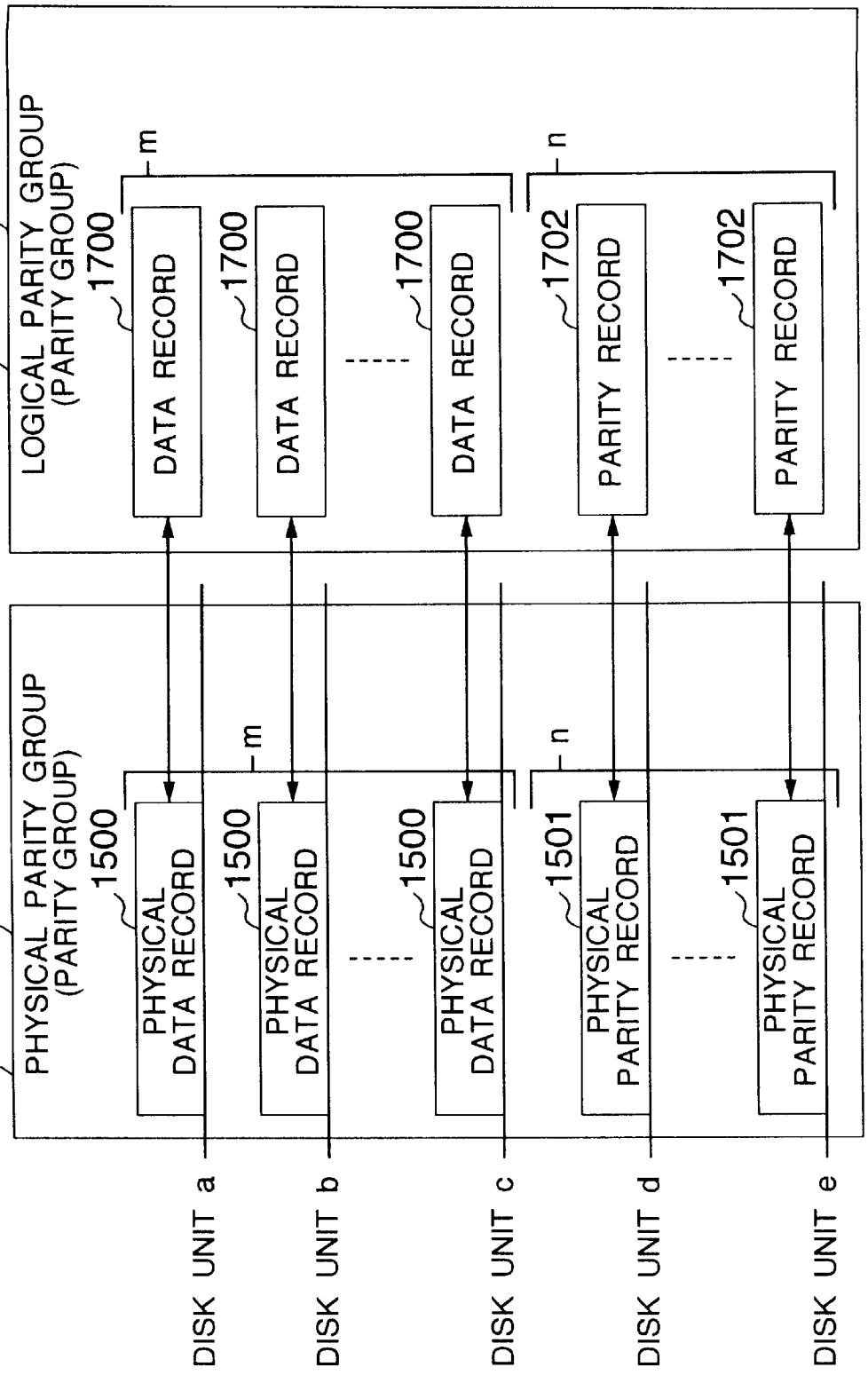
FIG. 4 shows a conceptual view for illustrating a concept of a parity group in the first embodiment.
Figure 5:
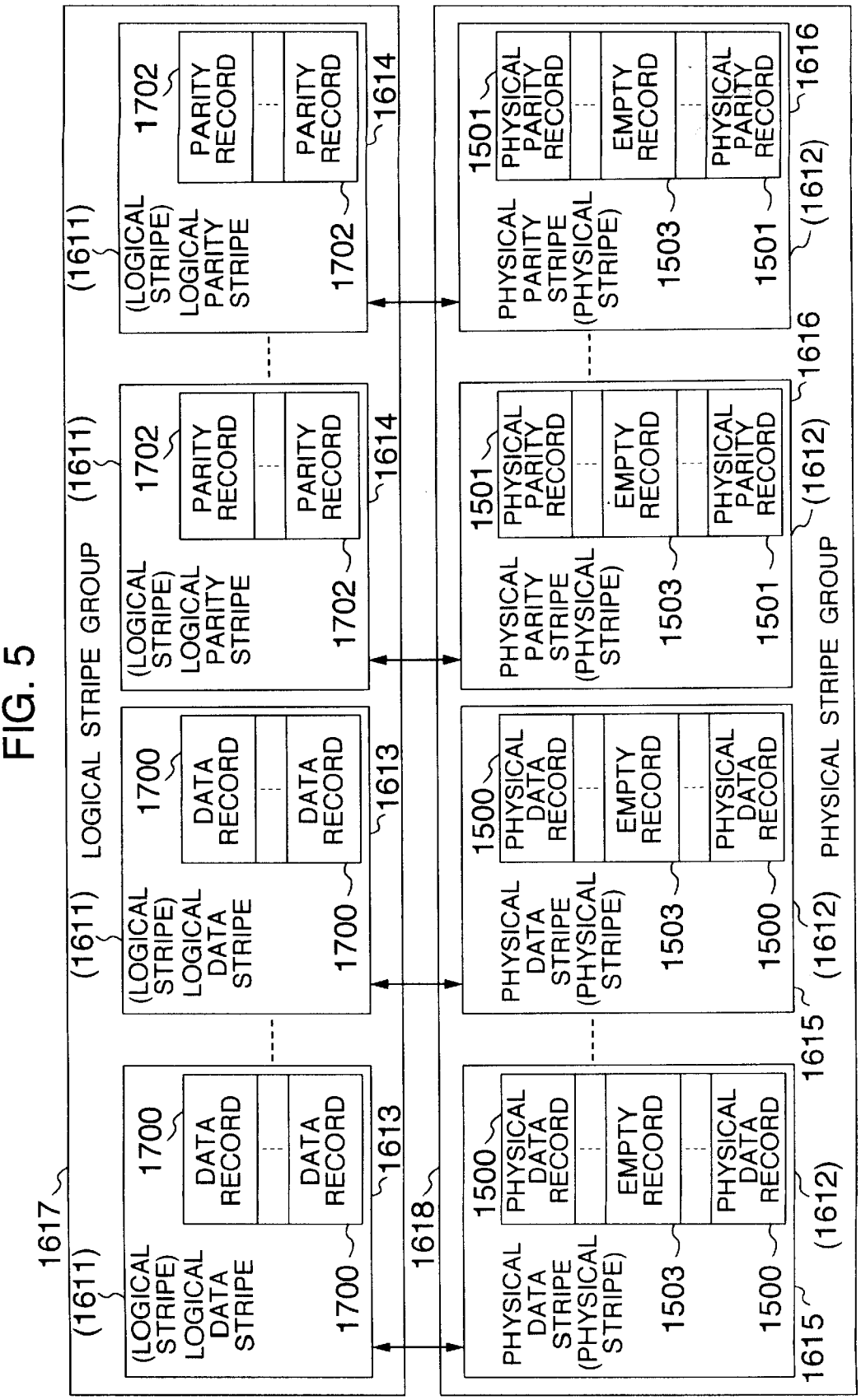
FIG. 5 shows a conceptual view for illustrating other concept of the parity group.

FIG. 4 shows configuration of the parity group 1600 in the disk array of the present embodiment. As shown in FIG. 4, a logical parity group 1601 consists of m data records 1700 and n parity records 1702. A physical parity group 1602 and a logical parity group 1601 corresponds one to one. Namely, a physical parity group consists of physical records 1502 in which the value of the data records 1700 and the parity records 1702 belonging to the corresponding logical parity group 1601. In the present embodiment, when the new value is written into the disk unit 1304, it is stored in the empty record 1503 rather than in the physical data record 1500 or the physical parity record 1501 in which the value has heretofore been stored. In order to improve the performance, however, it is necessary to select the empty record 1503 which is close to the original physical data record 1500 or physical parity record 1501. Accordingly, in the present embodiment, as shown in FIG. 5, a concept of logical stripe 1611 and physical stripe 1612 is used. The logical stripe 1611 is a set of data records 1700 or parity records 1702. The set of data records 1700 is called a logical data stripe 1613 and the set of parity records 1702 is called a logical parity stripe 1614. The physical stripe 1612 includes a physical data stripe 1615 and a physical parity stripe 1616. The physical data stripe 1615 is a set of physical data record 1500 and empty records 1503, and the physical parity stripe 1616 is a set of physical parity records 1501 and empty records 1503. The logical stripe 1611 and the physical stripe 1612 correspond one to one. When a data record 1700 is to be stored in an empty record 1503, an empty record 1703 in the physical stripe corresponding to the logical stripe in which the original physical data record 1700 is included is selected. This is also same for the parity record 1702. The physical record 1502 having the new value stored therein becomes the physical data record 1500 or the physical parity record 1501 and the physical record 1502 which has heretofore been the physical data record 1500 or the physical parity record 1501 becomes the empty record 1503.

In the present embodiment, m logical data stripes 1613 and n logical parity stripes 1614 form a logical stripe group 1617. Similarly, m physical data stripes 1615 and n physical parity stripes 1616 form a physical stripe group 1618. The physical stripes 1612 in the same physical stripe group 1618 are allocated to different disk units 1304. In FIG. 5, the lengths of the respective physical stripes 1612 are equal. When a plurality of physical parity stripes 1615 are always stored in same disk unit 1304, it is true that the lengths of the respective physical stripes 1612 must be equal. However, when the disk unit on which the physical parity stripes 1616 are arranged is circulated, the lengths of the physical parity stripes 1616 and the physical data stripes 1615 may be different. Further, one of the physical parity stripe 1616 and the physical data stripe 1615 may not be provided with the empty record 1503. When no empty record 1503 is provided, the data record 1700 and the parity record 1702 are always written into the same physical record. When the empty record 1503 is not provided in both the physical parity stripe 1616 and the physical data stripe 1615, it does not make sense in the present invention, and at least one of the physical parity stripe 1616 and the physical data stripe 1615 should be provided with the empty record 1503.

FIGS. 1A and 1B show functional block diagrams representing an outline of the storage unit subsystem of the present embodiment.

The new value of the parity record 1702 may be generated from the new value of the data record 1700, the old value of the data record 1700 and the old value of the parity record 1702.

The write request receiving unit 110 in the host computer 1305 receives a write request from the control unit 1300 and stores new value of the data record 1700 received from the write request in the cache 1308 and the non-volatile memory 1400 as the new data 100. When the storing is completed, the control unit 1305 reports the completion of the write request to the host computer 1300. The present invention is also effective when the following process is executed before reporting the completion of the write request.

The processes of the data destaging unit 111 in the control unit 1305 and the data write unit 112 in the disk unit 1304 are now explained. The data destaging unit 111 checks whether the old data 101 which is the old data of the data record 1700 is present in the cache or not. If it is present, the data destaging unit 111 generates an intermediate value, that is, the parity intermediate value 102 for updating a parity record from the old data 101 and the new data 100 and stores it in the cache 1308 and the non-volatile memory 1400. Then, the data destaging unit 1304 111 issues a request to write the new data 100 to the disk unit 1304 and send the new data 100 to the disk unit. When the physical data stripe 1615 includes the empty record 1503, the data write unit 112 in the disk unit 1304 may write the new data 100 in the originally allocated physical data record 1500 or the empty record 1503. Thus, the access time of the disk unit 1304 may be reduced.

When the old data 101 is not present in the cache 1308, the data destaging unit 111 requests to the disk unit 1304 to read the old data 101 from the physical data record 1500 corresponding to the old data 101 and further write the new data 100 to the empty record 1503. Since the data write unit 112 in the disk unit 1304 can write the new data 100 in any empty record 1503, the access time of the disk unit 1304 may be reduced. Further, the data write unit 112 generates the parity intermediate value 102 from the old data 101 and the new data 100 and sends the parity intermediate value 102 to the control unit 1305. The data destaging unit 111 of the control unit 1305 stores the received parity intermediate value 102 to the cache 1308 and the non-volatile memory 1400. The above is the explanation when the disk unit 1304 generates the parity intermediate value 102 although the parity intermediate value 102 may be generated by the control unit 1305. In this case, the data write unit 112 of the disk unit 1304 sends the read old data 101 to the control unit 1305. The data destaging unit 111 of the control unit 1305 generates the parity intermediate value 102 from the old data 101 and the new data 100 and stores it in the cache 1308 and the non-volatile memory 1400.

The processes of the data destaging unit 113 in the control unit 1305 and the parity write unit 114 in the disk unit 1304 are now explained. The parity destaging unit 113 determines whether the old parity 103 which is the old value of the parity record 1700 is present in the cache 1308 or not. If it is present, the parity destaging unit 113 generates the new value of the parity record 1702, that is, the new parity 104 from the old parity 103 and the parity intermediate value 102 and stores it in the cache 1308 and the non-volatile memory 1400. Then, the parity destaging unit 113 issues a request to write the new parity 104 in the disk unit 1304. When the physical parity stripe 1616 includes the empty record 1503, the parity write unit 114 in the disk unit 1304 may write the new parity 104 in the originally allocated physical parity record 1501 or the empty record 1503. Thus, the access time of the disk unit 1304 may be reduced.

When the old parity 103 is not present in the cache 1308, the parity destaging unit 113 requests the disk unit 1304 to read the old parity 103 from the physical parity record 1501 corresponding to the old parity 103, generates the new parity 104 from the read old parity 103 and the control unit 1305, and writes the new parity 104 in the empty record 1503 or the physical data record 1500 corresponding to the original old parity 101. Since the data write unit 112 in the disk unit 1304 can write the new parity 104 in any empty record 1503, the access time of the disk unit 1304 may be reduced.

Figure 6:
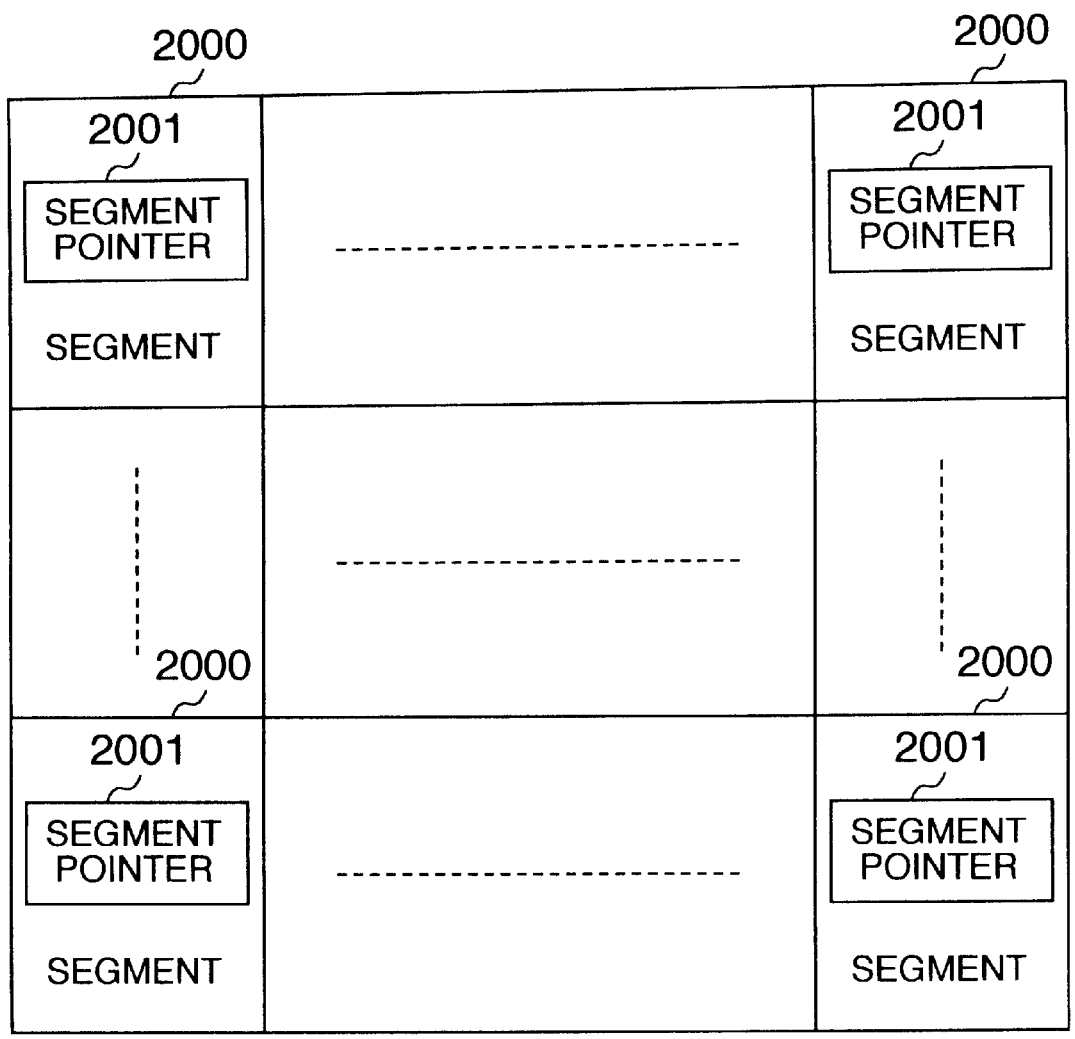
FIG. 6 shows a structure of a cache memory.

FIG. 6 shows a structure of the cache 1308. The cache 1308 is divided into a plurality of segments 2000. Each segment 2000 stores the logical data stripe 1613 or the logical parity stripe 1614. A segment pointer 2001 couples unallocated segments 2000. A structure of the non-volatile memory 1400 may be identical to that of the cache memory 1308 and the explanation thereof is omitted.

Figure 7:
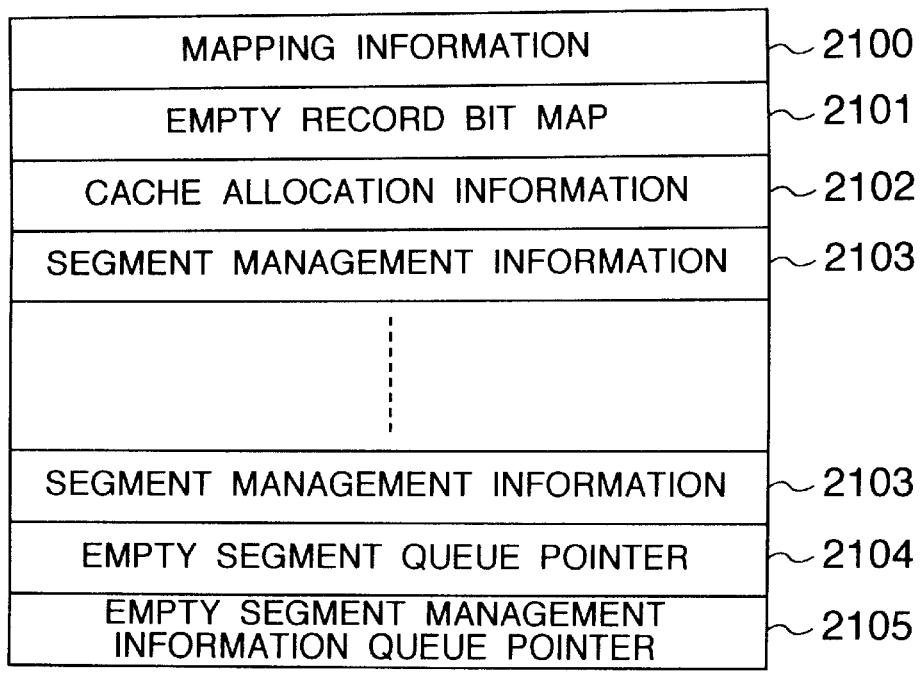
FIG. 7 shows a structure of a directory.

FIG. 7 shows a structure of the directory 1309. The directory 1309 comprises mapping information 2100, an empty record bit map 1201, cache allocation information 2102, segment management information 2103, an empty segment queue pointer 2104 and an empty segment management information queue pointer 2105. As many segment management information 2103 as the number of segments 2000 in the cache 1308 are present. As will be described later, they do not correspond one to one to the segments 2000. The mapping information 2100 and the empty record bit map 2101 may be provided in the disk unit 1304, and in this case the control unit 1305 need not be provided with the mapping information 2100 and the empty record bit map 2101. The respective information are now explained in detail. Since a structure of the non-volatile memory 1401 is identical to that of the directory 1309, the explanation thereof is omitted.

Figure 8:
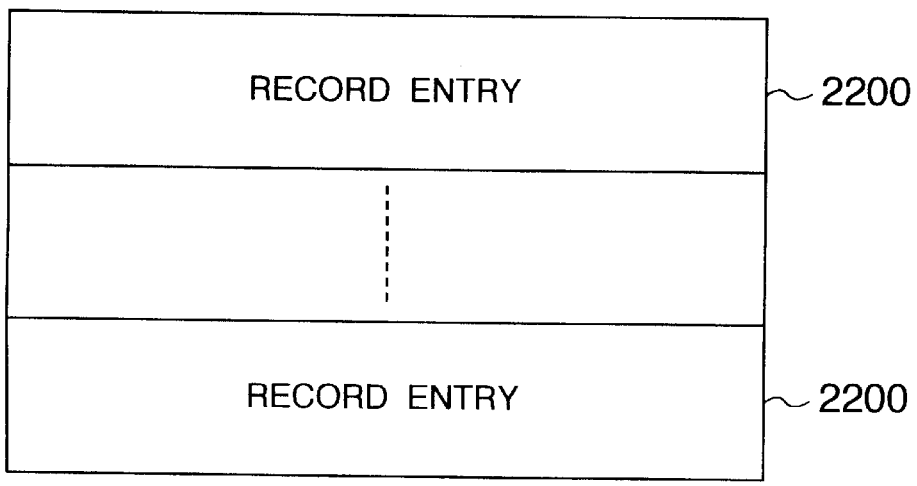
FIG. 8 shows a structure of mapping information.

FIG. 8 shows a structure of the mapping information 2100. The mapping information represents which physical data record 1500 and which physical parity record 1501 the logical data record 1700 and the logical parity record 1702 are allocated to. A record entry 2200 is information which exists corresponding to the data record 1700 or the parity record 1702. A physical record address of a physical record to which the corresponding record is allocated is set in the record entry 2200.

Figure 9:
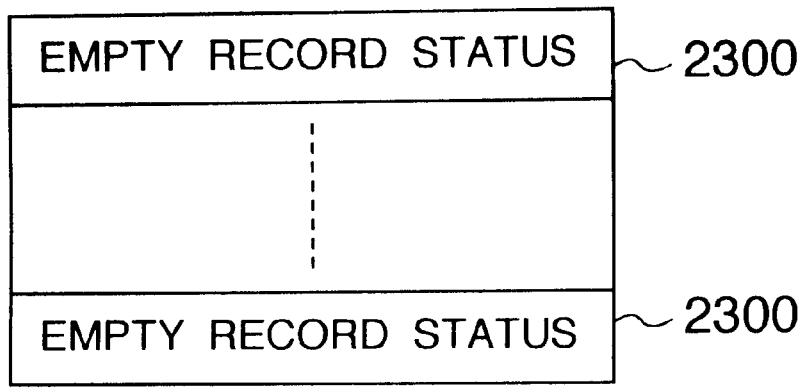
FIG. 9 shows a structure of an empty record bit map.

FIG. 9 shows a structure of the empty record bit map 2101. An empty record state 2300 represents whether a physical record is an empty record 1503 or not.

Figure 10:
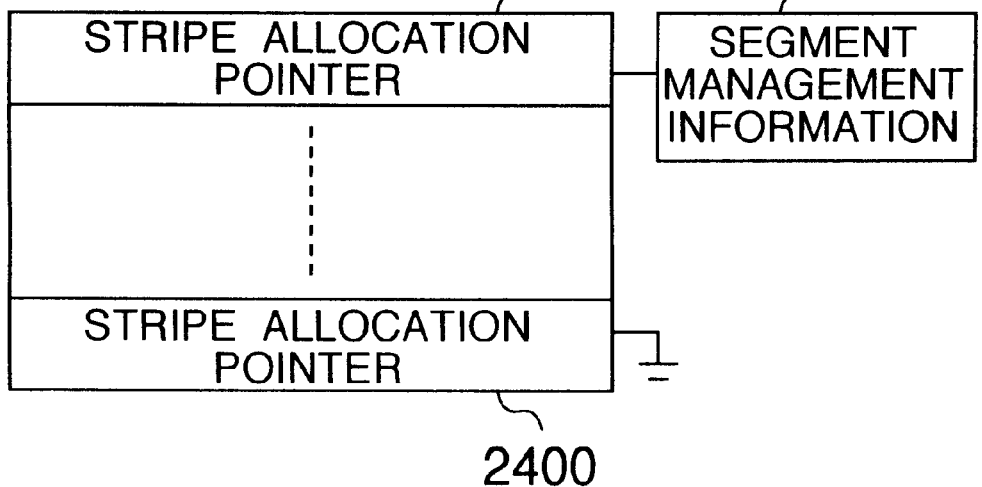
FIG. 10 shows a structure of cache allocation information.

FIG. 10 shows a structure of the cache allocation information 2102. It represents whether logical stripes 1611 (a logical data stripe 1613 and a logical parity stripe 1614) are stored in the cache 1308 or not. A stripe allocation pointer 2400 is information provided for the logical stripe unit. When the corresponding logical stripe 1611 is stored in the cache 1308, the stripe allocation pointer 2400 points the segment management information 2103 for managing the cache segment. If the corresponding logical stripe 1611 is not stored in the cache 1308, the value is null.

Figure 11:
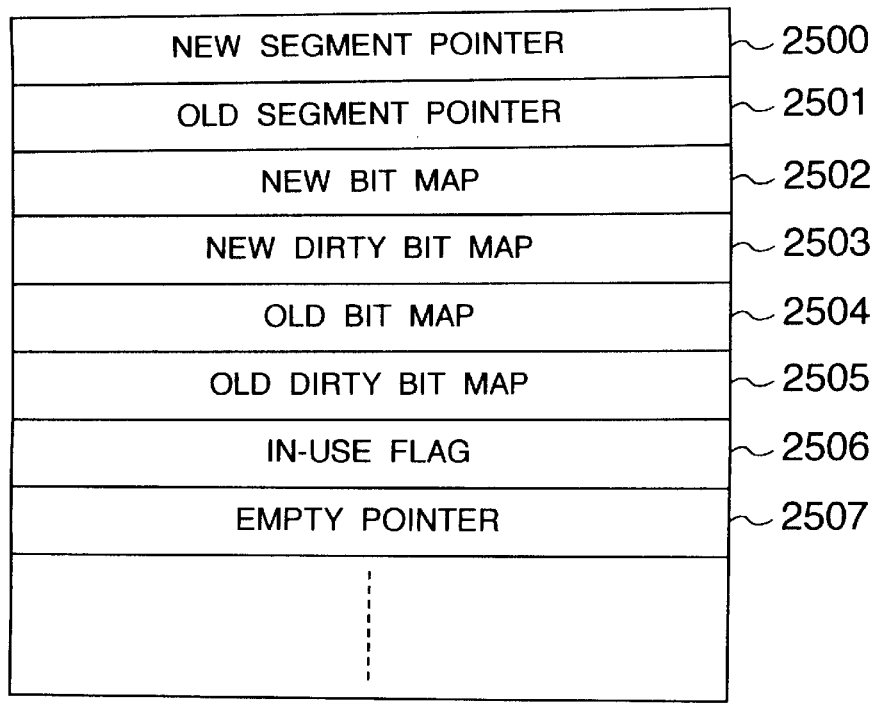
FIG. 11 shows a structure of segment management information.

FIG. 11 represents information relating to the present invention among the segment management information 2103.

The new segment pointer 2500 points one of the segments 2000 in the cache. When the segment management information 2103 is the segment management information 2103 of the logical data stripe 1613, the pointed segment 2000 contains the value of the data record 1700 for which the new value of the parity record has not yet been generated. When the segment management information 2103 is the segment management information 2103 of the logical parity stripe 1614, the new segment pointer 2500 points the segment 2000 which contains the intermediate value 102 of the parity record 1702 generated when the new value of the parity record 1702 is generated.

The old segment pointer 2501 also points one of the segments 2000 in the cache. When the segment management information 2103 is the segment management information of the logical data stripe 1613, the old segment pointer 2501 points the segment 2000 which contains the value of the old data 101. When the segment management information 2103 is the segment management information 2103 of the physical parity record 1501, the values of the old parity 103 or the new parity 104 are stored in the segment 2200 pointed by the pointer.

The new bit map 2502 represents whether or not each of the records (data records or parity records) in the corresponding logical stripe exist in the segment 2000 pointed by the old segment pointer 2500.

The new dirty bit map 2503 represents whether or not the value of the new parity 104 corresponding to the data records 1700 or the parity records in the corresponding logical stripe has yet been generated.

The old bit map 2504 represents whether or not each of the data records 1700 or the parity records 1702 in the corresponding logical stripe exists in the segment 2000 pointed by the new segment pointer 2501.

The old dirty bit map 2505 represents whether or not each of the data record 1700 or the parity record 1702 stored in the segment 2200 pointed by the old segment pointer 2501 for which the value thereof has not been written in the disk unit 1304.

The in-use flag 2506 is a flag to represent that the segment management information 2103 is in use and the empty pointer 2507 is a pointer to couple the empty segment management information 2103.

Figure 12A:
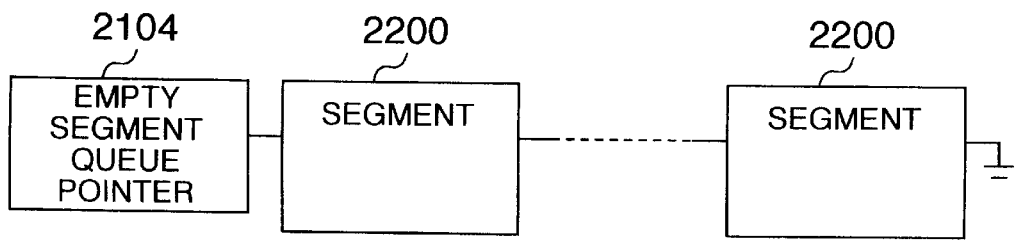
FIGS. 12A and 12B show structures of an empty segment queue and an empty segment management information queue.
Figure 12B:
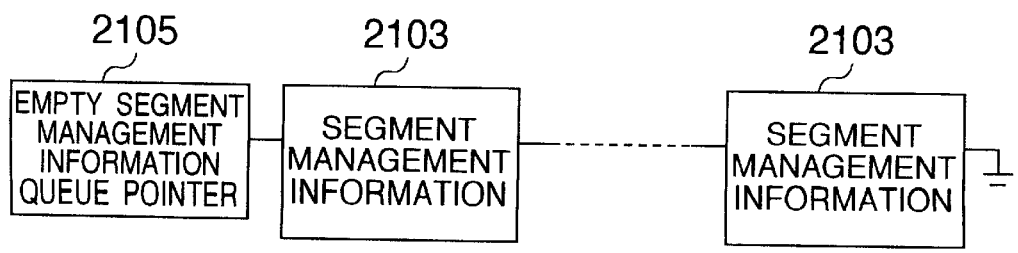

FIGS. 12A and 12B show structures of an empty segment queue and an empty segment management queue. As shown, the empty segment queue is formed by chaining the empty segments 2000 by the segment pointers 2001 with the empty segment que pointer 2104 being at the top. The empty segment management queue is formed by chaining the empty segment management information 2103 by the empty pointers 2507 with the empty segment management information queue pointer 2105 being at the top.

Figure 13:
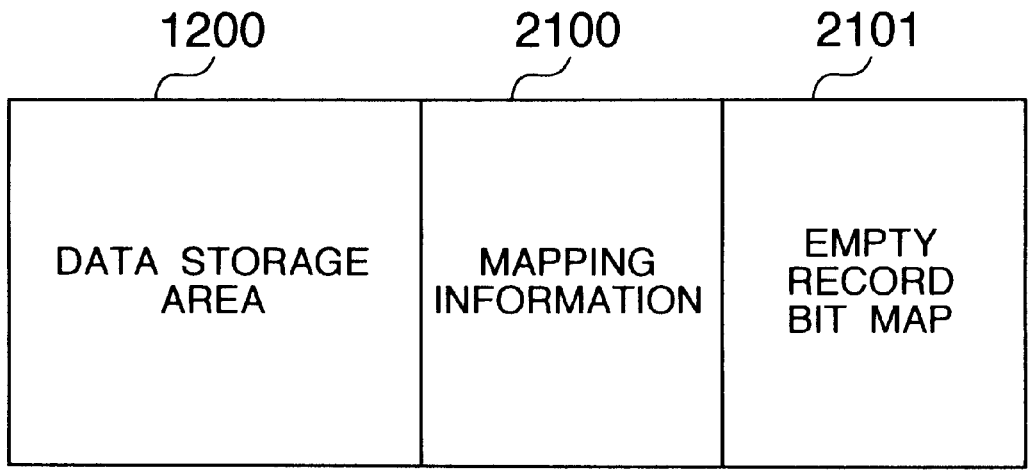
FIG. 13 shows a structure of a buffer provided in a disk unit.

FIG. 13 shows a structure of the buffer 1313 in the disk unit 1304. The buffer 1313 comprises a data storage area 1200, mapping information 2100 and an empty record bit map 2101. The data storage area 1200 stores the data to be transferred between the storage medium 1312 and the control unit 1305. When the mapping information 2100 and the empty record bit map 2101 are included in the control unit 1305, they need not be provided in the buffer 1313. When the mapping information 2100 and the empty record bit map 2101 are included in the buffer 1313, it is desirable that the buffer 1313 is non-volatile. The mapping information 2100 and the empty record bit map 2101 included in the buffer 1313 are the information of the logical stripe and the physical stripe included in the disk unit 1304. The structure themselves of the mapping information 2100 and the empty record bit map 2101 are same as those included in the control unit 1305 (FIGS. 8 and 9) and the explanation thereof is omitted.

Figure 14:
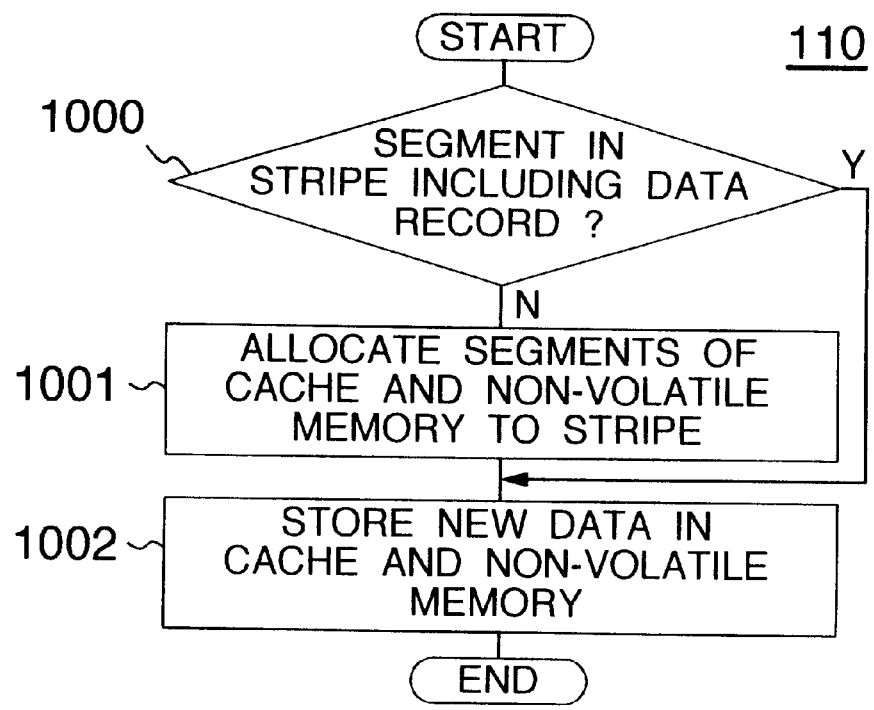
FIG. 14 shows a process flow chart of a write request receive unit.

FIG. 14 shows a process flow of the write request receiving unit 110 in the control unit 1305.

The write request receiving unit 110 starts the operation when it receives a write request from the host computer 1300. In step 1000, the directory 1309 and the segment allocation information 2102 of the non-volatile memory management information 1401 are referred to determine whether the cache 1308 or the non-volatile memory 1400 is allocated to the data record 1700 received in the write request. If it is allocated, the process jumps to step 1002. If it is not allocated, the segment 2000 is allocated in step 1001. Specifically, the processing represents that the new segment pointer 2500 of the segment management information 2103 points the allocated segment 2000. In the step 1002, the write request receiving unit 110 receives the write data from the host computer 1300, that is, the new data 104 and stores it in the non-volatile memory 1400 and the new data 104. At this time, necessary information in the segment allocation information 2102 of the non-volatile memory management information 1401 is updated. Specifically, the corresponding bit of the new bit map 2502 and new dirty bit map 2503 is set. This completes the operation.

Figure 15:
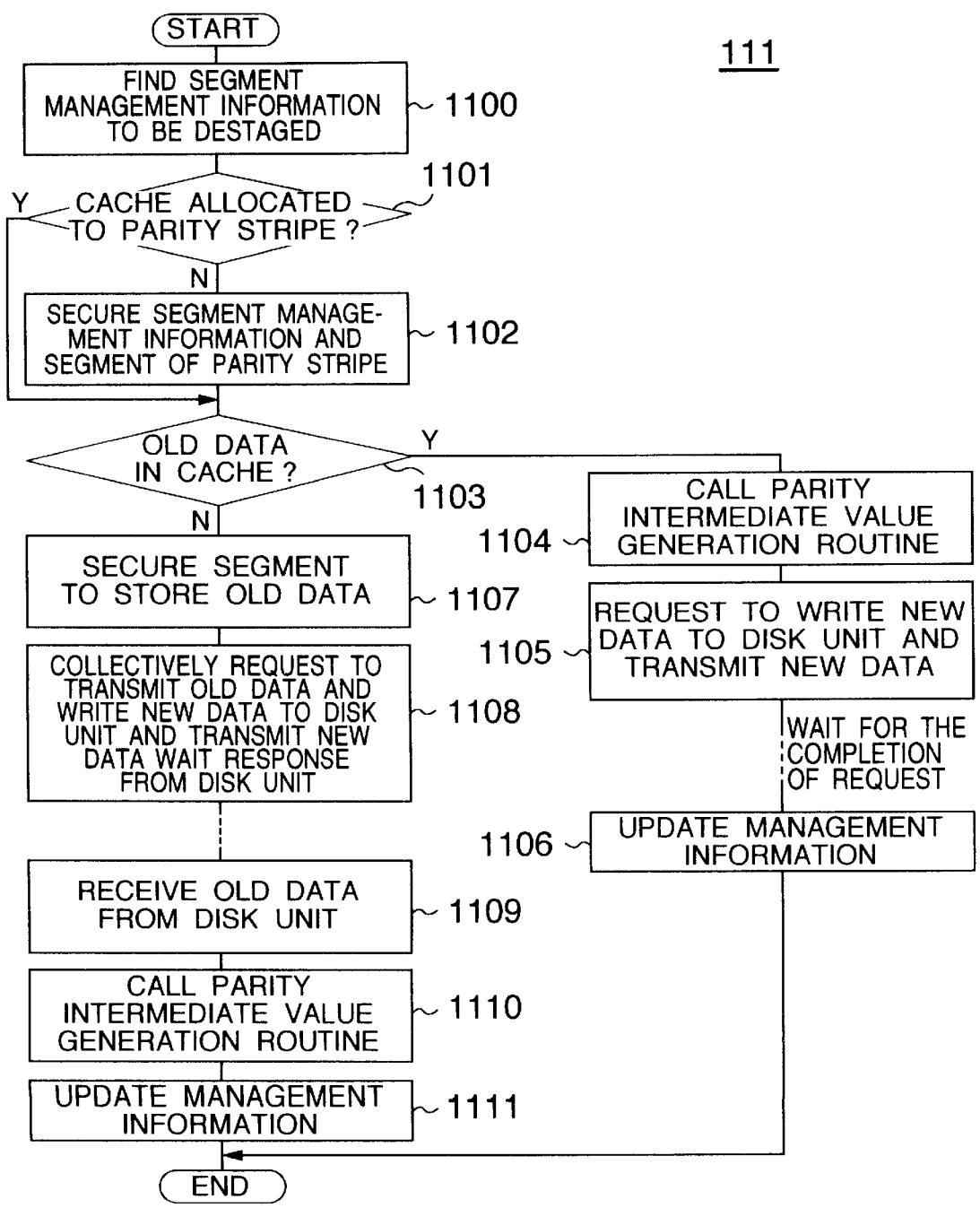
FIG. 15 shows a process flow chart of a data destaging unit.

FIG. 15 shows a process flow chart of the data destaging unit 111 in the control unit 1305. In step 1100, the data destaging unit 111 searches the segment management information 2103 to determine whether the data record 1700 to be destaged is present or not. Specifically, the data destaging unit 111 searches the segment management data 2103 allocated to the logical data stripe 1611 having the new dirty bit map 2503 set. When it is found, the following process is executed.

First, in step 1101, the data destaging unit 111 refers the segment allocation information 2103 to determine whether the cache 1308 and the non-volatile memory 1400 are allocated to the logical parity stripe 1614 corresponding to the logical data stripe 1613. If they are allocated, the process jumps to step 1103. If they are not allocated, the segment 2000 of the cache 1308 and the non-volatile memory 1400 are allocated in step 1102.

In step 1103, the data destaging unit 111 determines whether the old value of the data record 1700, that is, the old data 101 is present in the cache 1308 or not. Specifically, it determines whether the old bit map 2504 corresponding to the data record 1700 having the old bit map 2503 set is set or not. If it is not set, the process jumps to step 1107. If it is set, the generation of a parity intermediate value is called in step 1104.

Figure 16:
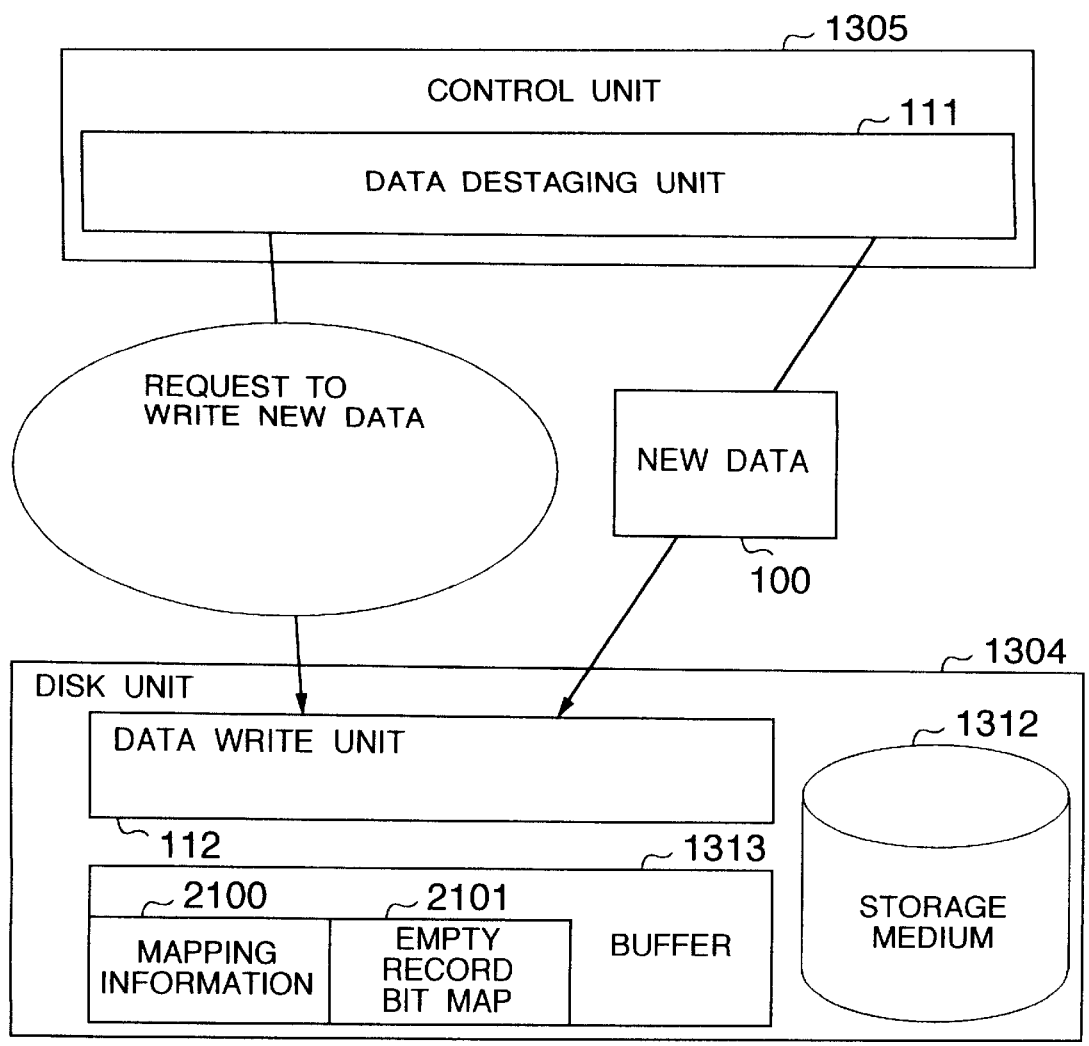
FIG. 16 shows a conceptual view of function distribution between the control unit and the disk unit in writing new data when a mapping function is allocated to the disk unit.

Then, in step 1105, the data destaging unit 111 issues a request to write the new data 100 in the disk unit 1304. Specific content of the request differs depending on the function allocation of the control unit 1305 and the disk unit 1304. In a first case, the disk unit 1304 executes the conversion from the logical stripe 1611 to the physical stripe 1612 (the conversion from the data record 1700 and the parity record 1702 to the physical data record 1500 and the physical parity record 1502). In this case, as shown in FIG. 16, the data destaging unit 111 designates the data record 1701 to be written and the physical record 1502 to be written is determined by the disk unit 1304. Secondly, when the conversion from the logical stripe 1611 to the physical stripe 1612 is executed by the control unit 1305, two further methods are possible. In a method shown in FIG. 17, the control unit 1305 notifies all empty records 1503 in the physical stripe 1612 and the physical record 1502 in which the data record 1700 has originally been stored, and the disk unit 1304 writes the received data in the first found physical record 1502 among the physical records 1502 designated by the disk unit 1304. In this case, the disk unit 1304 reports the physical record 1502 in which the writing has been actually made to the control unit 1305. On the other hand, the control unit 1305 changes the mapping information in accordance with the received information. In a method shown in FIG. 18, the control unit 1305 directly designates the physical record 1502 in which the new data 103 is written. In this case, the disk unit 1304 merely writes the received data in the designated physical record 1502. Accordingly, in order to reduce the write time, it is necessary that the control unit 1305 recognizes the position of the read/write head 1315 of the disk unit 1304. In the end, as shown in FIG. 18, the control unit 1305 requests to the disk unit 1304 to inform the position of the read/write head 12315. The disk unit 1304 informs the position to the control unit 1305 upon request.

Figure 17:
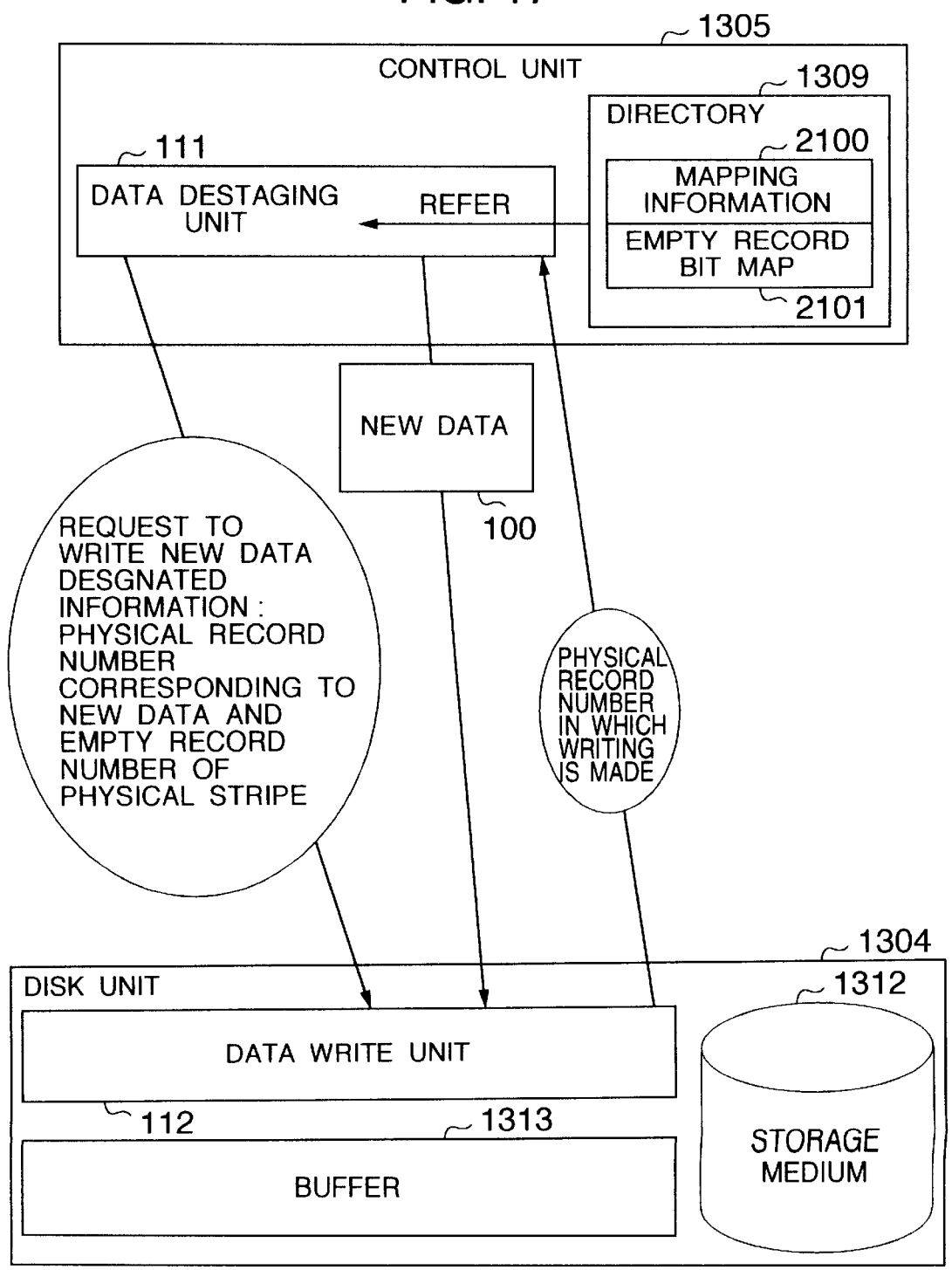
FIG. 17 shows a conceptual view of function distribution between the control unit and the disk unit in writing the new data when the mapping function is allocated to the control unit.
Figure 18:
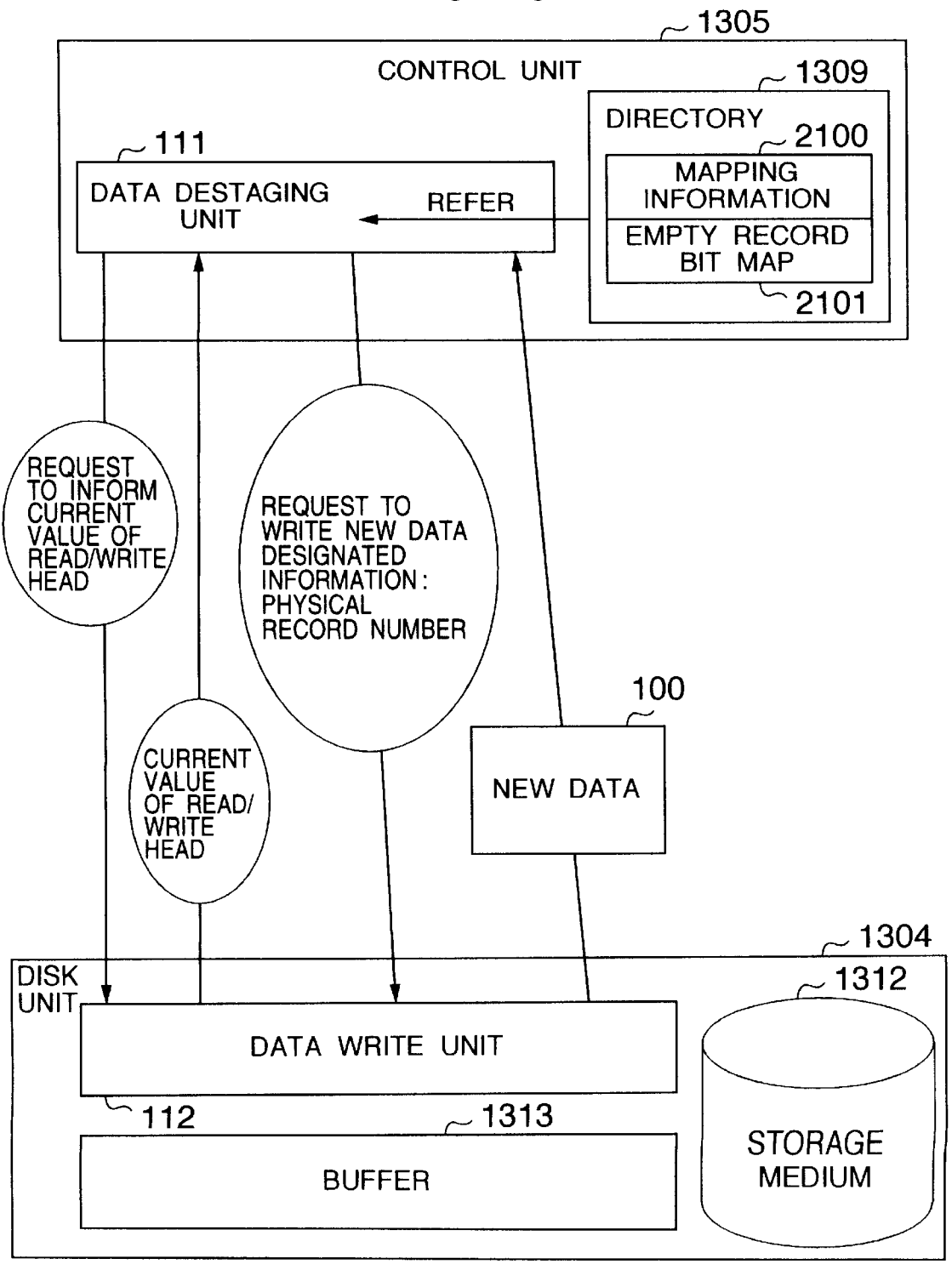
FIG. 18 shows a conceptual view of function distribution between the control unit and the disk unit in reading the old data and writing the new data when the mapping function is allocated to the disk unit.
Figure 36:
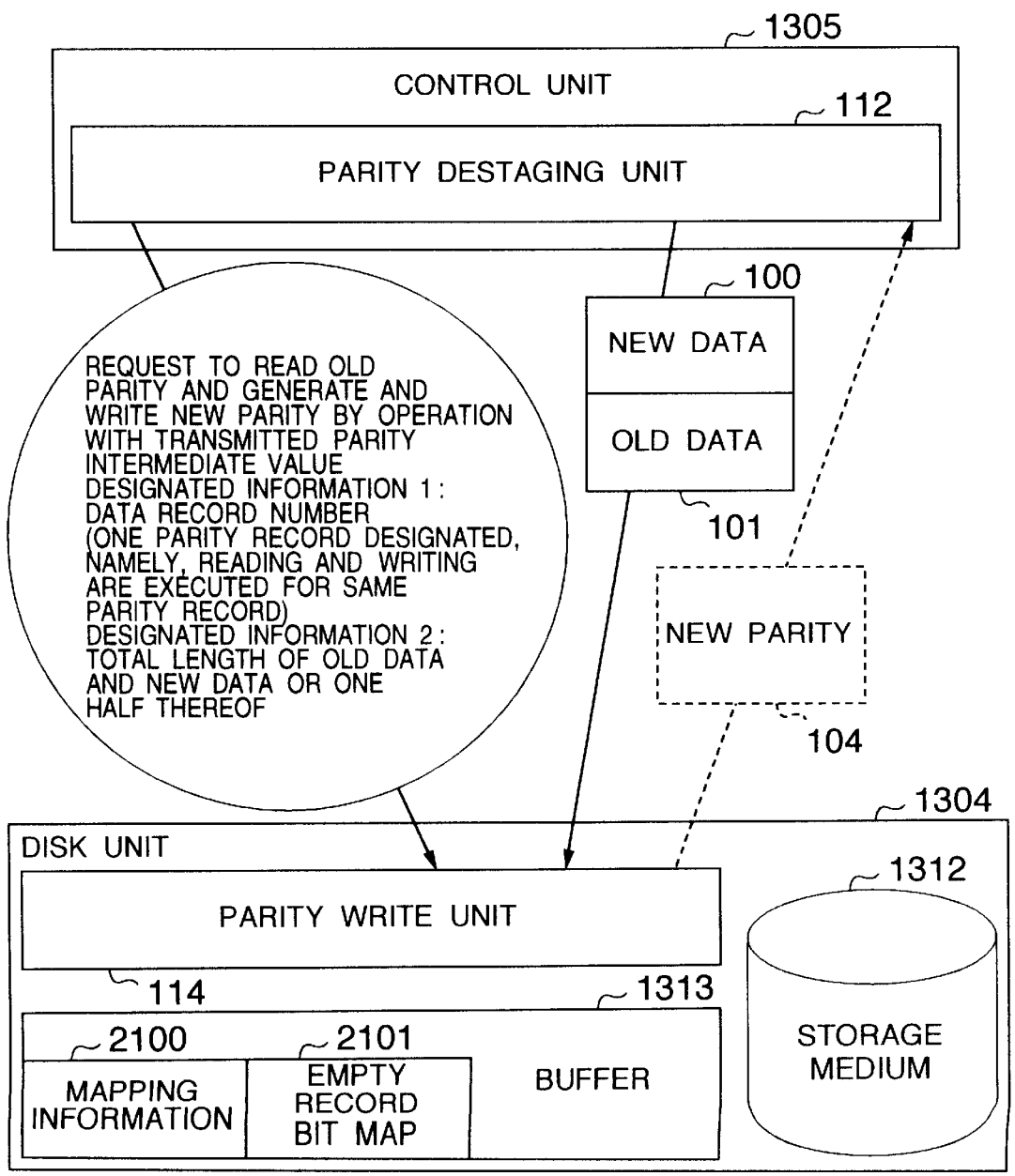
FIG. 36 shows a conceptual view of function distribution between the control unit and the disk unit in reading the old parity, generating the new parity and writing the new parity when the mapping function is allocated to the disk unit in the functional configuration shown in FIG. 35.
Figure 37:
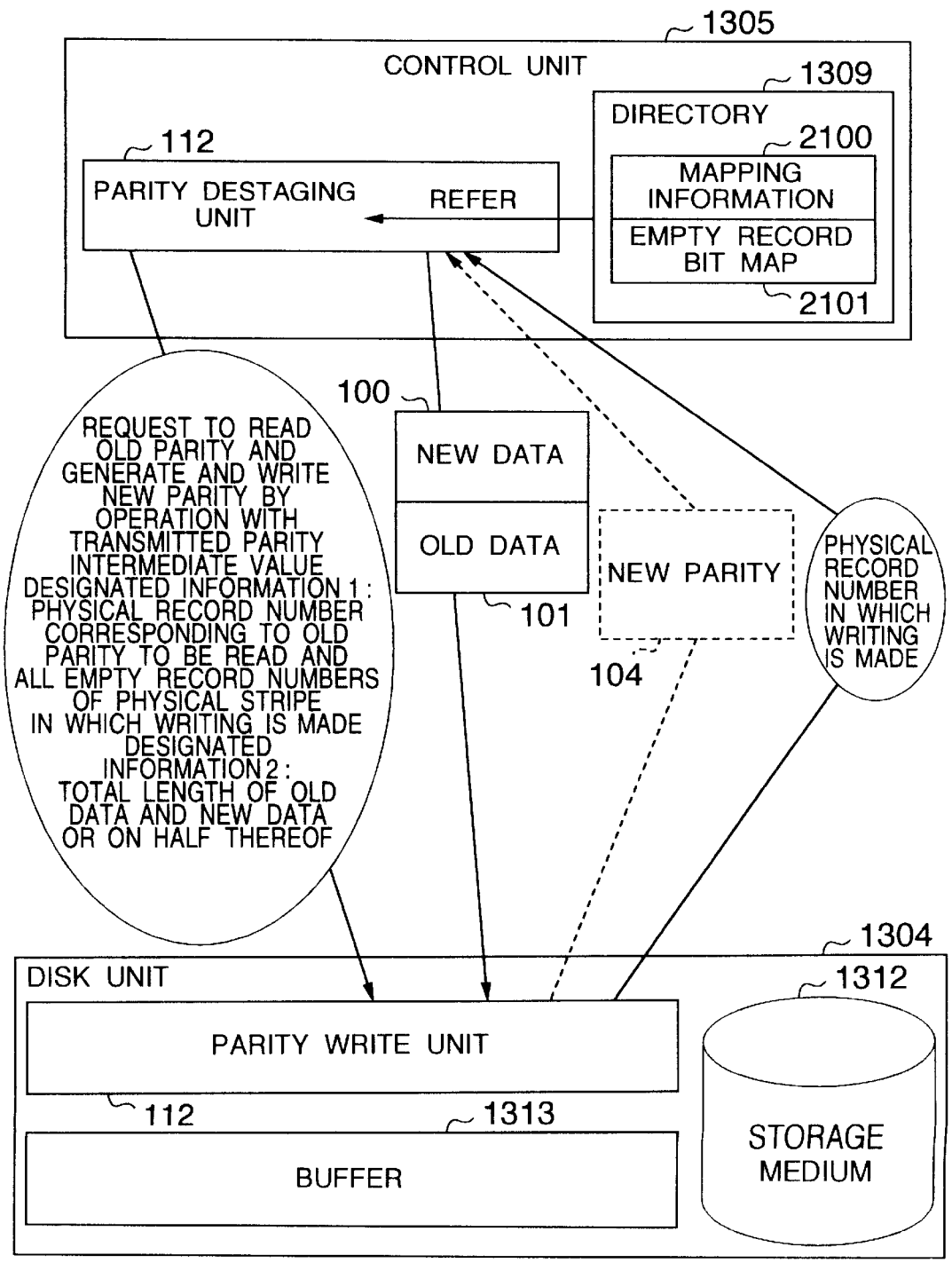
FIG. 37 shows a conceptual view of function distribution between the control unit and the disk unit in reading the old parity, generating the new parity and writing the new parity when the mapping function is allocated to the control unit in the functional configuration shown in FIG. 35.
Figure 38:
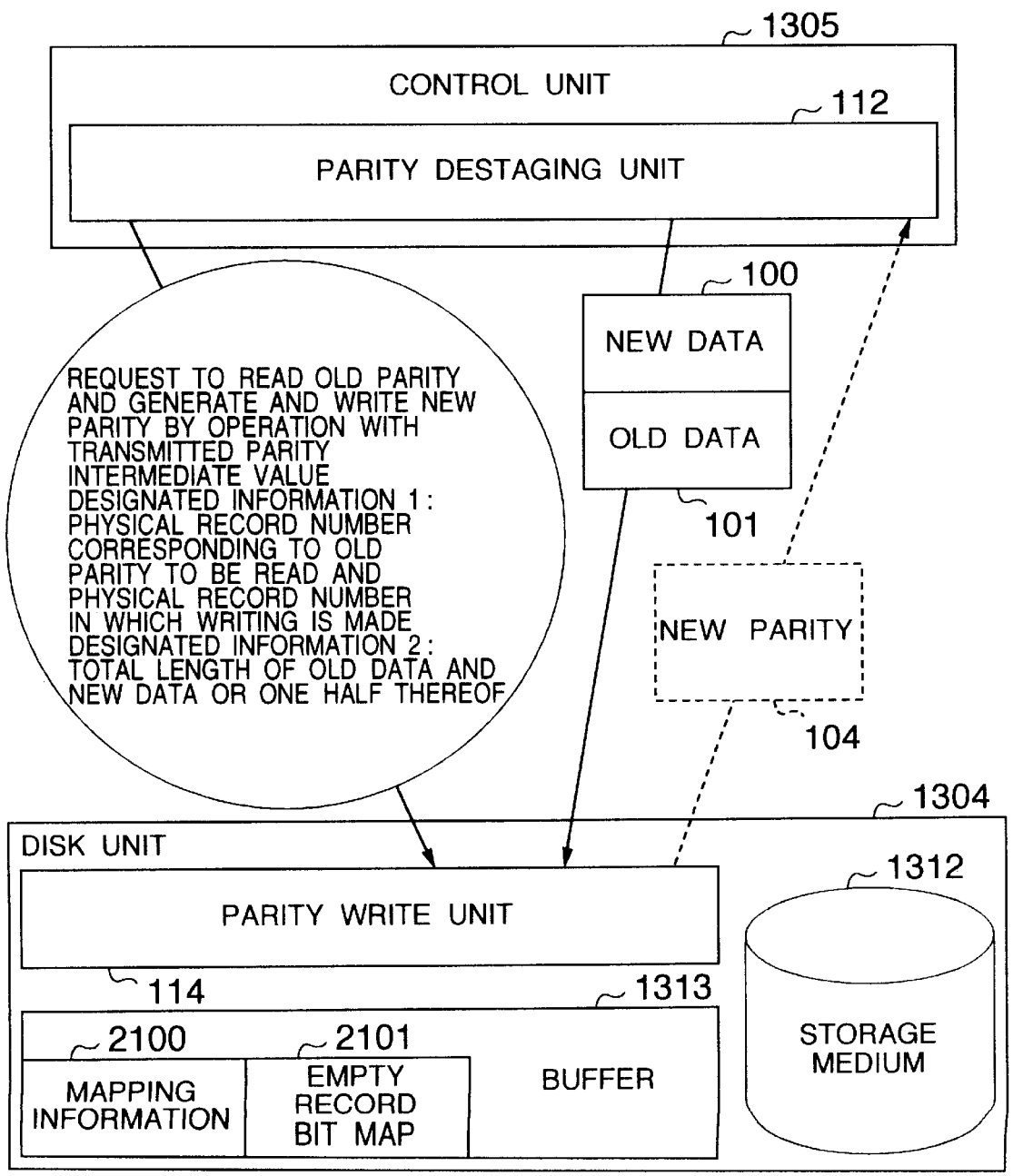
FIG. 38 shows a conceptual view of function distribution between the control unit and the disk unit in reading the old parity, generating the new parity and writing the new parity when the mapping function is allocated to the control unit in the functional configuration shown in FIG. 35.

The process shown in FIGS. 16~18 merely writes the content of the data record 1700 in the physical data record 1500. Accordingly, it is applicable even when the parity record 1702 is not included as shown in FIG. 4. When the parity record 1702 is not included, a structure of the stripe 1610 is as shown in FIG. 35. The process shown in FIGS. 16~18 is also applicable when the content of the data record 1700 is written in two or more physical records 1501. In this case, a structure of the stripe 1610 is as shown in FIG. 36.

After that, the data destaging unit 111 completes the process to wait the completion of the destage request.

When the data destaging unit 111 receives the notice of completion of data writing from the disk unit 1304, it restarts the process. In step 1106, the data destaging unit 111 turns off the new dirty segment 2503 of the corresponding segment management information 2103. When the mapping information 2100 is managed in the control unit 1305, the mapping information 2100 is updated in accordance with the physical record 1502 for which the writing is executed. Thus, the process is completed.

On the other hand, in step 1103 of FIG. 15, if the old data 101 is not present in the cache 1308, whether the segment 2000 to store the old data 101 is allocated or not is examined in step 1107, and if it is not allocated, the segment 2000 is allocated.

Figure 19:
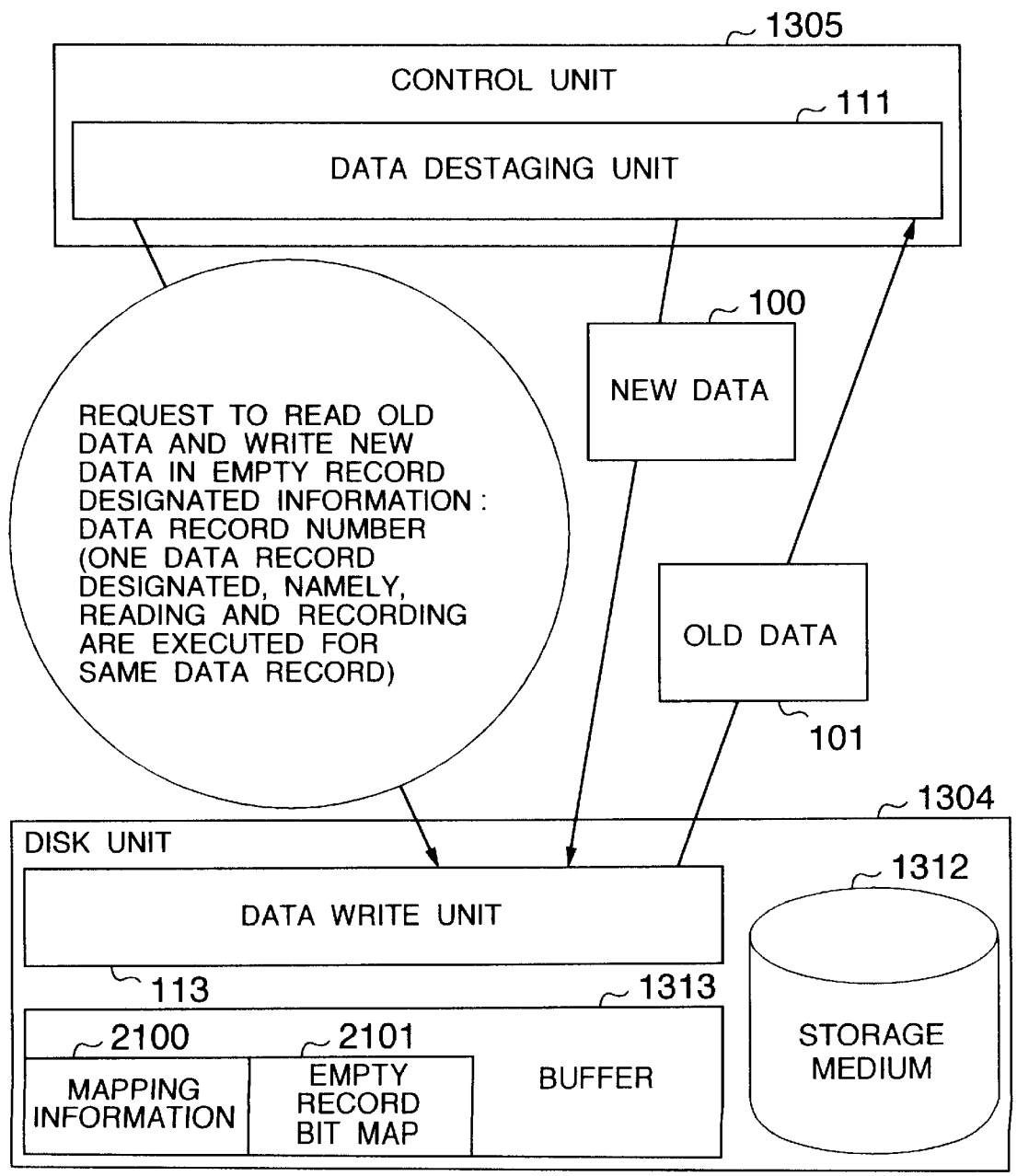
FIG. 19 shows a conceptual view of function distribution between the control unit and the disk unit in reading the old data and writing the new data when the mapping function is allocated to the control unit.

Then, in step 1108, the data destaging unit 111 reads the old data 101 from the physical data record 1500 corresponding to the old data 101 into the disk unit 1304 and requests to write the new data 100 in the empty record 1503. In this case, the content of the write request depends on the function distribution between the control unit 1305 and the disk unit 1304. In a first case, the conversion of the logical stripe 1611 and the physical stripe 1612 is executed by the disk unit 1305. In this case, as shown in FIG. 19, the data destaging unit 111 merely designates the data record 1700 for which the reading and the writing are executed. The disk unit 1304 recognizes which physical record 1502 the designated data record 1700 corresponds to and grasps which physical record 1502 is the empty record 1503.

Figure 20:
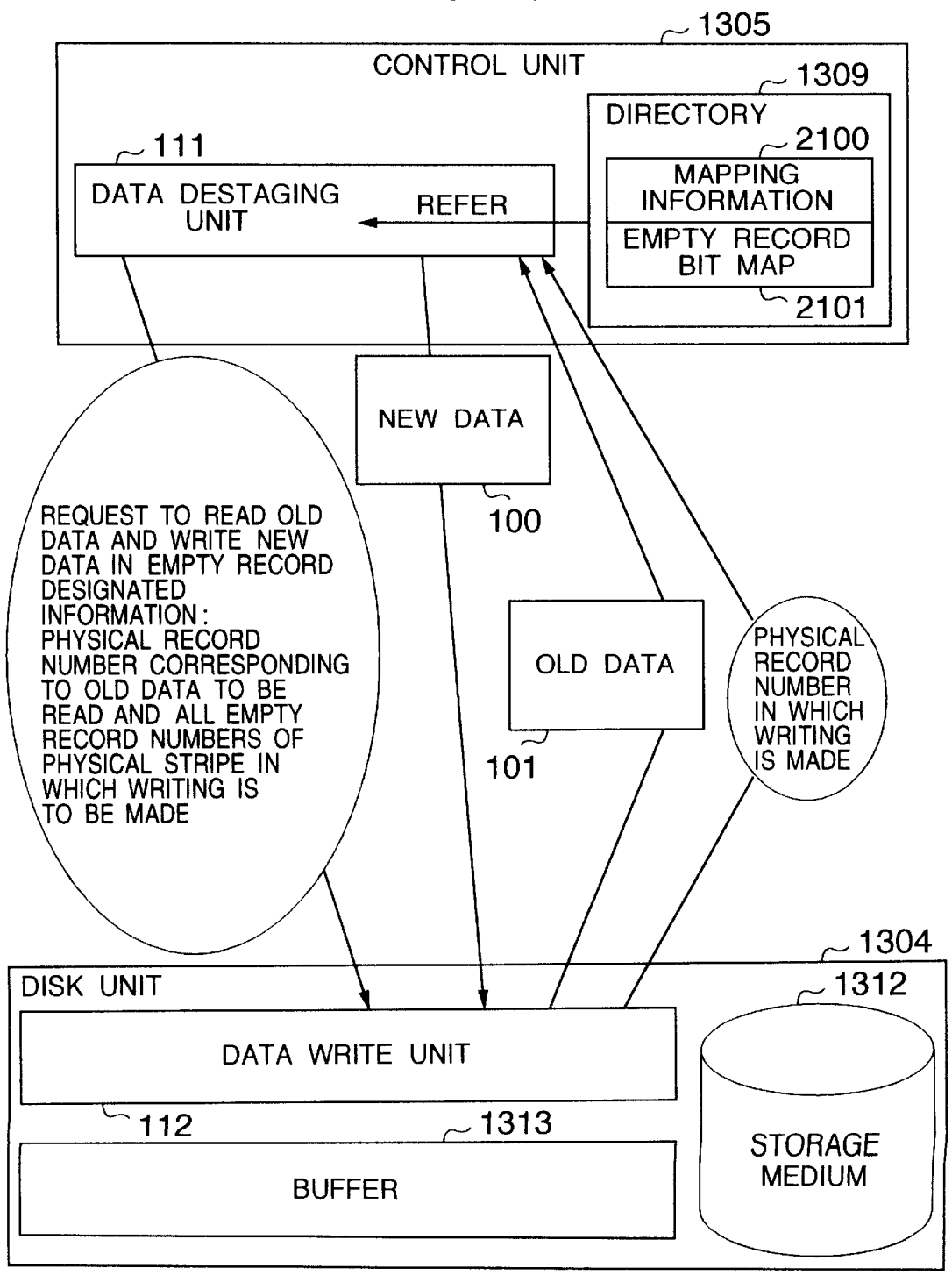
FIG. 20 shows a conceptual view of function distribution between the control unit and the disk unit in reading the old data and writing the new data when the mapping unction is allocated to the control unit.
Figure 21:
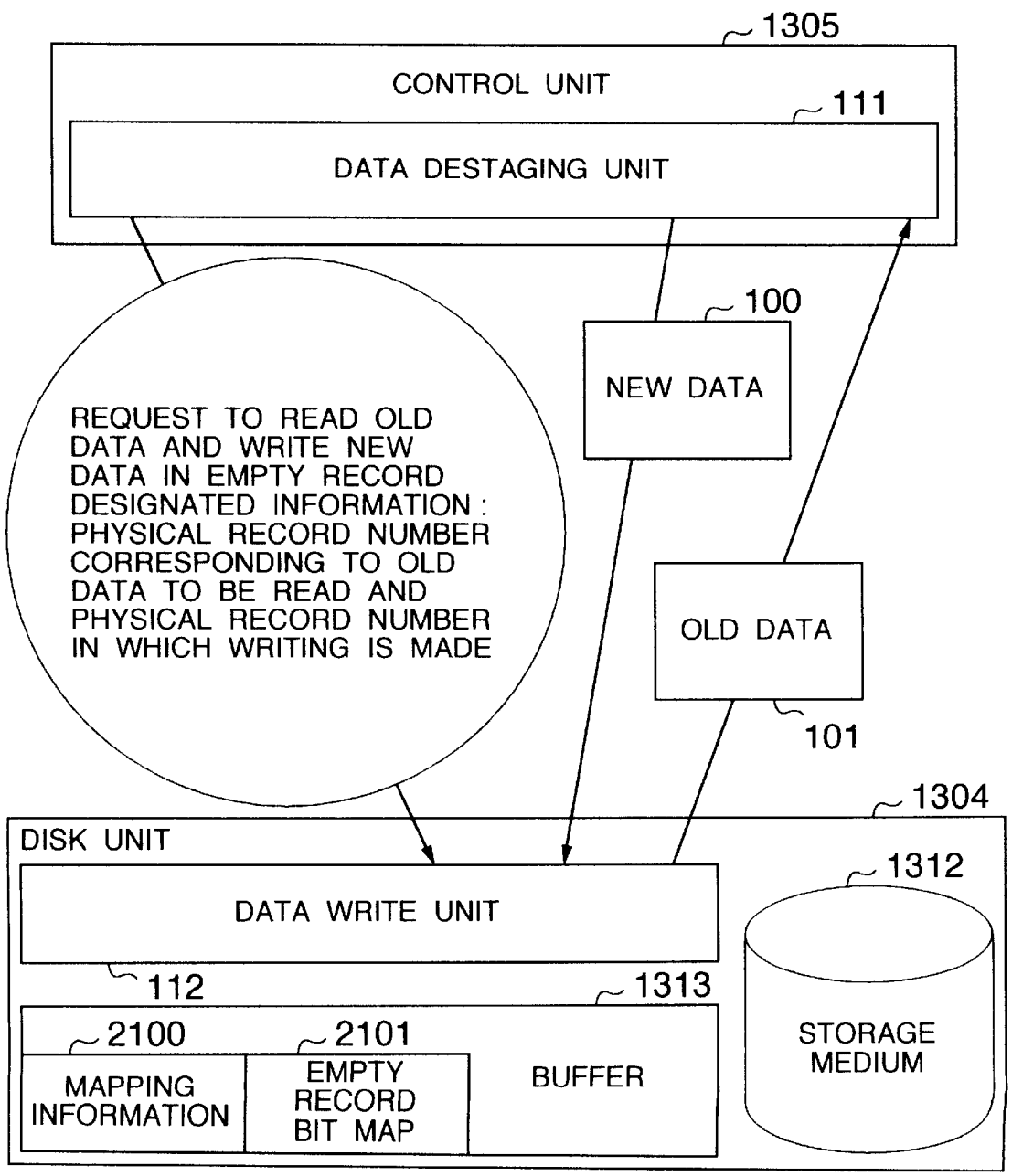
FIG. 21 shows a conceptual view of function distribution between the control unit and the disk unit in reading the old data and writing the new data when the mapping function is allocated to the control unit.

In a second case, the conversion of the logical stripe and the physical stripe is executed by the control unit 1305. In this case, three further methods are possible. First, in a method shown in FIG. 20, the control unit 1305 informs all empty records 1503 in the physical stripe. The disk unit 1304 writes the received data in the first found empty record 1503 and reads the designated physical record 1502. In the remaining two methods, the control unit 1305 directly designates the physical record in which the data is to be written. In a method shown in FIG. 21, in order to reduce the write time, the control unit 1305 recognizes the position of the read/write head 1315 of the disk unit 1304 and calculates that physical record 1502 in which the data is to be written which can reduce the write time. Therefore, as shown in FIG. 21, the control unit 1305 requests to the disk unit 1304 to inform the position of the read/write head 1315. The disk unit 1304 informs the position to the control unit 1305 upon request.

Figure 22:
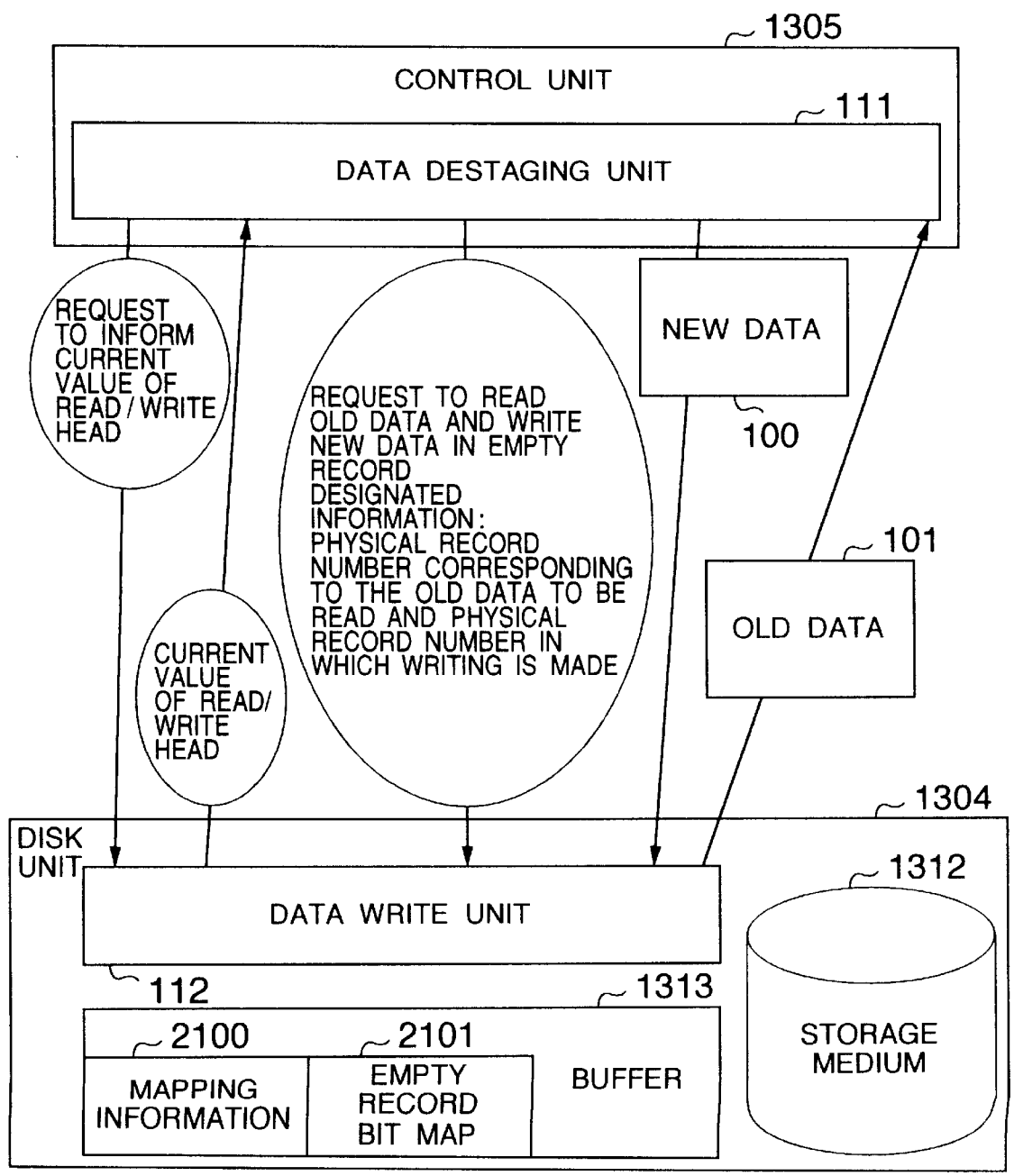
FIG. 22 shows a conceptual view of function distribution between the control unit and the disk unit in reading the old data and writing the new data when the mapping function is allocated to the control unit.

In a method shown in FIG. 22, the reading of the physical data 1500 is first executed and then the writing of the empty record 1503 is executed. In this case, the closest one if the empty records 1503 following to the physical data record 1500 is selected as the physical record 1502 in which the data is to be written.

The data destaging unit 111 completes the process to wait the report from the disk unit 1304.

When the data destaging unit 111 receives the report of completion of reading from the disk unit 1304, it restarts the process. In step 1110, the data destaging unit 111 receives the read physical data record 1500 from the disk unit 1304 and stores it in the segment 2000. Then, in step 1109, the data destaging unit 111 receives the report of completion of the destage request from the disk unit 1304. In step 1110, the data destaging unit 111 calls the parity intermediate value generation routine. After that, in step 1111, the data destaging unit 111 turns off the old dirty segment 2505 of the corresponding segment management information 2103. Then, it sets the corresponding old bit map 2504 in the segment management information 2102. When the mapping management information 2100 is managed in the control unit 1305, the mapping information 2100 is updated in accordance with the physical record 1502 for which the writing is made. Thus, the process is terminated.

Figure 23:
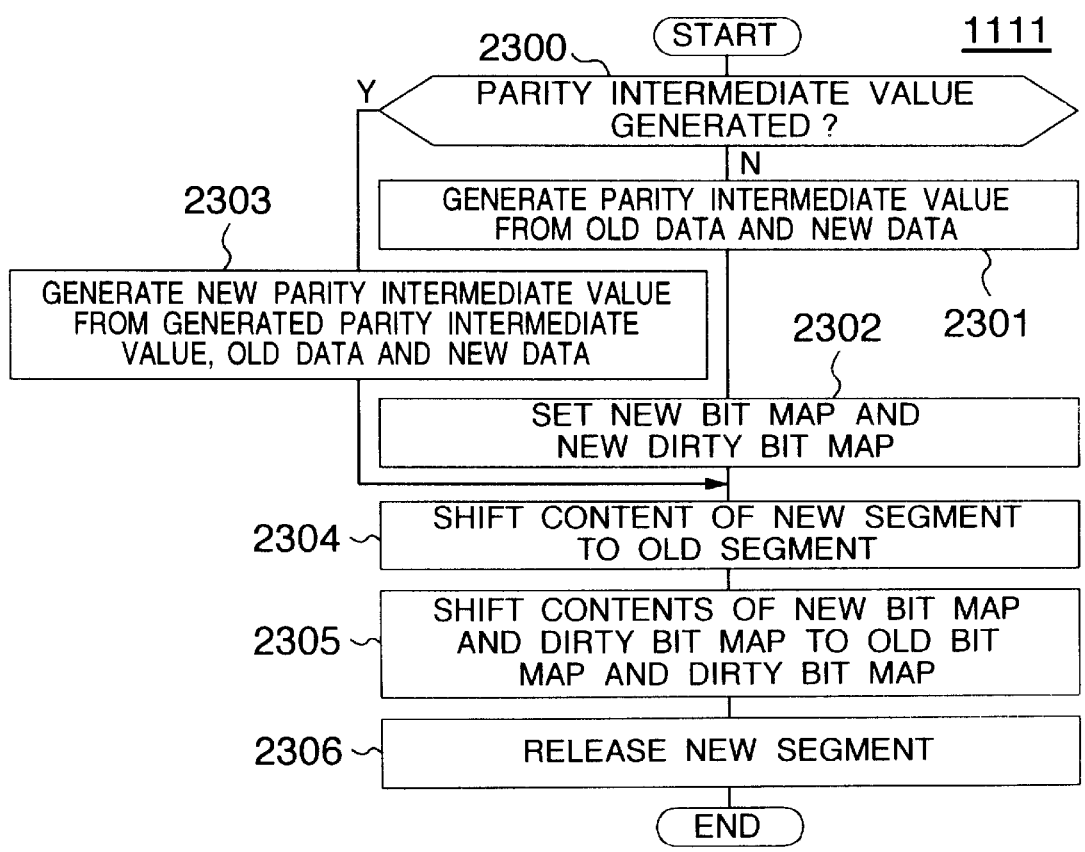
FIG. 23 shows a process flow chart of a parity intermediate value generation routine.

FIG. 23 shows a process flow of the parity intermediate value generation routine. In step 2300, whether the parity intermediate value 102 has been generated or not is determined. Specifically, whether the corresponding new bit map 2503 in the segment management information 2103 allocated to the logical parity stripe 1614 is set or not is determined. If it has been generated, the process jumps to step 2303. In step 2301, the parity intermediate value 102 is generated from the old data 101 and the new data 100 and it is stored in the segment 2000 allocated to the logical parity stripe 1614, in the non-volatile memory 1400. In step 2302, the corresponding new bit map 2502 and new dirty bit map 2503 in the segment management information 2103 allocated to the logical parity stripe 1614 are set. Then, the process jumps to step 2304.

In step 2303, the data destaging unit 111 generates a new intermediate value 103 from the old data 101, the new data 100 and the generated parity intermediate value 103 and stores it in the segment 2000 allocated to the logical parity stripe 1614, in the cache 1308 and the non-volatile memory 1400.

In step 2304, the content of the data record 1700 having the new bit map 2502 set in the segment 2000 pointed by the new segment pointer 2500 in the segment management information 2103 allocated to the logical data stripe 1613 is copied to the corresponding location of the segment 2000 pointed by the old segment pointer 2501. Further, the bits having the new bit map 2502 set are copied to the old bit map 2504.

In a step 2305, the bits having the new dirty bit map 2503 in the logical data stripe 1613 set in the segment management information 2103 allocated to the logical data stripe 1613 are copied to the old dirty bit map 2505.

In a step 2306, the segment 2000 pointed by the new segment pointer 2500 in the segment management information 2103 allocated to the logical data stripe 1613 is made empty. In addition, the new bit map 2502 and the new dirty bit map 2503 are turned off and the old segment pointer 2500 is made null.

The process of the steps 2304–2306 is applied to not only the cache 1308 and the directory 1309 but also, the non-volatile memory 1400 and the non-volatile memory 1401.

Figure 24:
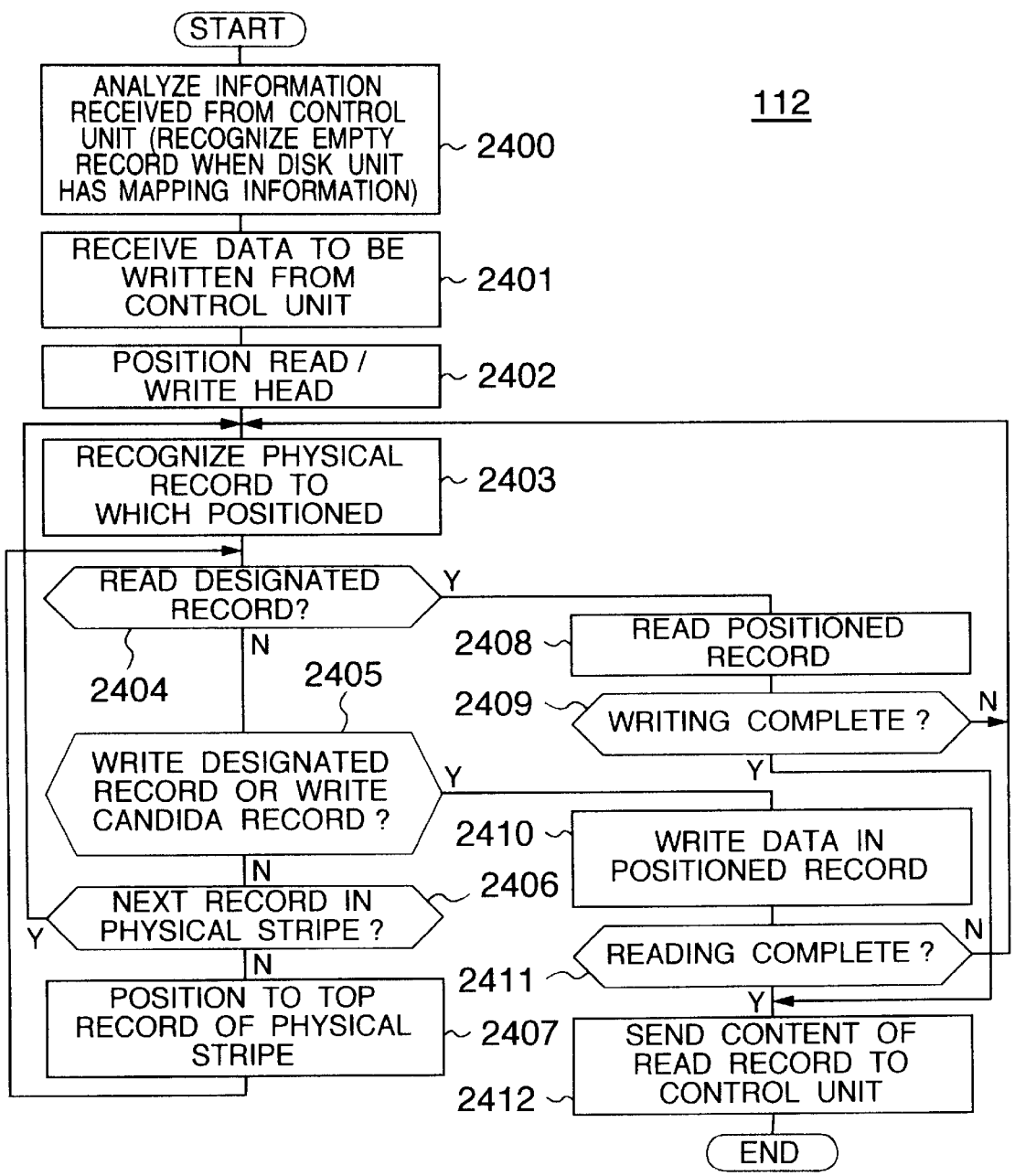
FIG. 24 shows a process flow of a data write unit.

FIG. 24 shows a process flow of the data write unit 112 in the disk unit 1304. First, in a step 2400, the information received from the control unit 1305 is analyzed. When the mapping information 2100 is managed by the disk unit 1304, the empty record 1503 is recognized from the related logical stripes. In a step 2401, the data to be written is received from the control unit 1305. Then, in a step 2402, the positioning process of the read/write head 1315 is executed. In a step 2403, a specific physical record 1502 to which the read/write head 1315 is positioned is recognized.

In a step 2404, whether the positioned physical record 1502 is the physical record 1502 designated for the reading or not is recognized. If it is so, the process jumps to step 2408. In step 2405, whether the positioned physical record 1502 is the physical record 1502 designated for the writing or the physical record 1502 for which the writing can be made or not is determined. If it is so, the process jumps to step 2410.

In step 2406, whether the next physical record is included in the physical stripe 1618 or not is recognized. If it is so, the process jumps to step 2404 to start the process for the next physical record. If it is not included, the positioning process of the read/write head 1315 is executed in step 2408 to position it to the first physical record 1502 of the physical stripe 1612. Then, the process jumps to step 2403.

In step 2408, the physical record to which the read/write head 1315 is positioned is read. In a step 2409, whether the writing is completed or not is checked. If it is not completed, the process jumps to step 2404. If it is completed, the process jumps to step 2412.

In step 2410, the write data is written in the physical record 1502 to which the read/write head is positioned. In step 2411, whether it is necessary to read the physical record 1502 or not is checked, and if it is still necessary, the process jumps to step 2404.

In step 2412, whether the physical record 1502 has been read or not is checked, and if it has been read, the physical record 1502 is sent to the control unit 1305. In step 2413, the completion of the request is reported to the control unit 1305. When the disk unit 1304 has the mapping information, the mapping information 2100 is updated before the completion report is returned.

Figure 25:
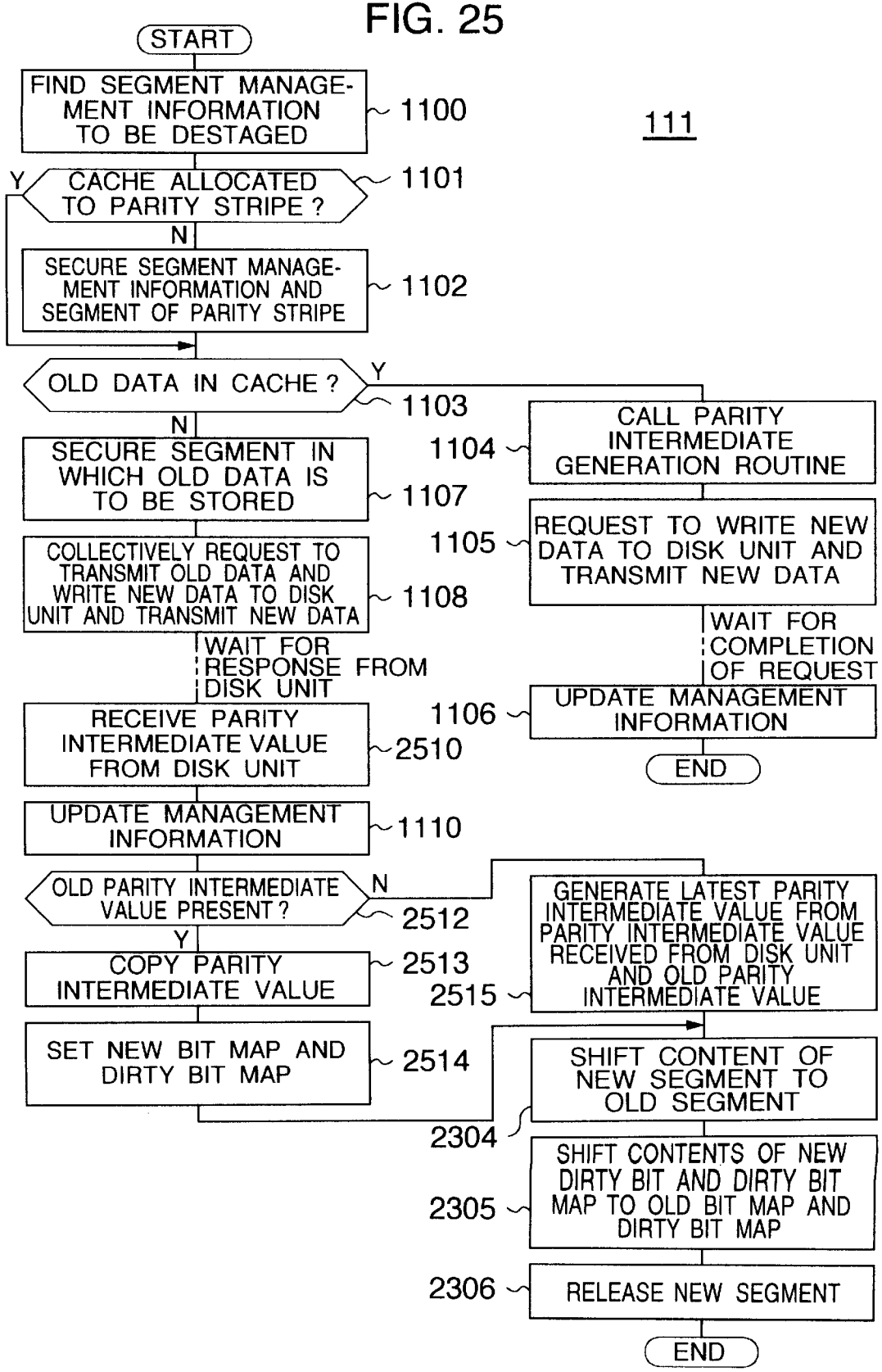
FIG. 25 shows a process flow of a data destaging unit when the parity intermediate value is generated in the disk unit.
Figure 26:
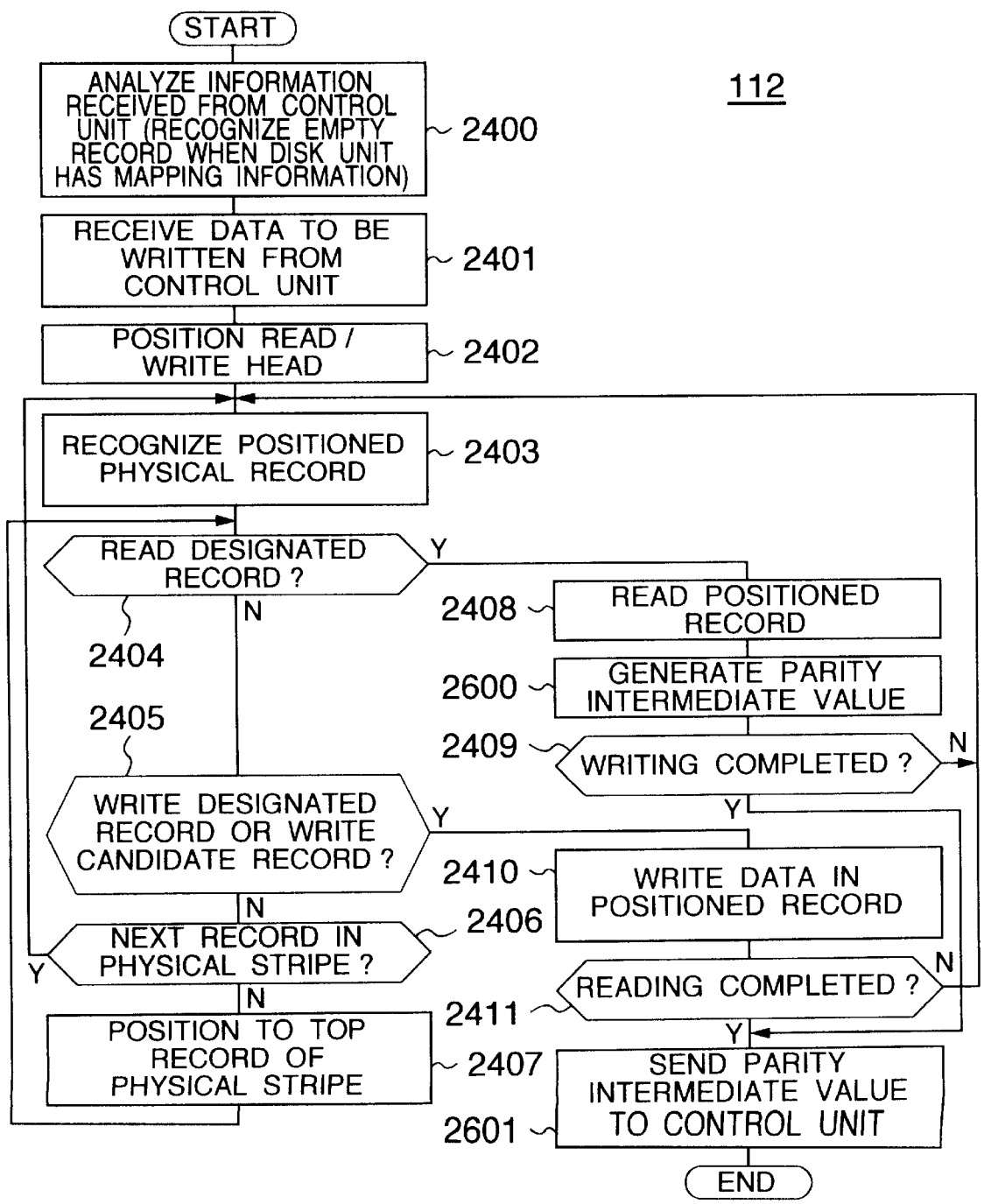
FIG. 26 shows a process flow chart of a data write unit when the parity intermediate value is generated in the disk unit.

The above data flows of the data destaging unit 111 and the data write unit 112 shown in FIGS. 15, 23, and 24, are the process flows in the case where the generation function of the parity intermediate value 102 is not provided in the disk unit 1304. FIGS. 25 and 26 show process flows of the data destaging unit 111 and the data write unit 112 in the case where the generation function of the parity intermediate value 102 is provided in the disk unit 1304. In the respective process flows, the steps designated by the same numbers as those in the process flows of FIGS. 15, 23 and 24 have the same process contents as the corresponding processes. Only those having different process contents are now explained.

In the process flow of FIG. 25, in step 2510 the data destaging unit 111 receives the parity intermediate value 102 rather than the old data 101 from the disk unit 1304. In this case, in step 2512, whether the old parity intermediate value 102 has been already generated is present or not is checked. If the old parity intermediate value 102 is not present, the parity intermediate value 102 is copied in step 2513 to the segments 2000 corresponding to the parity stripes 1612 of the cache 1308 and the non-volatile memory 1400. Further, in step 2514, the corresponding new bit map 2502 and new dirty bit map 2503 are set. Then, the process jumps to step 2304. In step 2515, the new parity intermediate value 102 is generated from the parity intermediate value 102 received from the disk unit 1304 and the parity intermediate value 102 which has been generated. Then, the new parity intermediate value 102 is copied to the corresponding segment 2000 of the parity stripes 1612 of the cache 1308 and the non-volatile memory 1400. (Since the content of the steps 2304~2306 is same as that shown in FIG. 23, the explanation is omitted.)

In a process flow of FIG. 26, difference resides in that the data write unit 112 generates in step 2600 the parity intermediate value 102 from the read physical data 1502 and the received write data. Then, in step 2601, it sends the generated parity intermediate value 102 to the control unit 1305.

Figure 27:
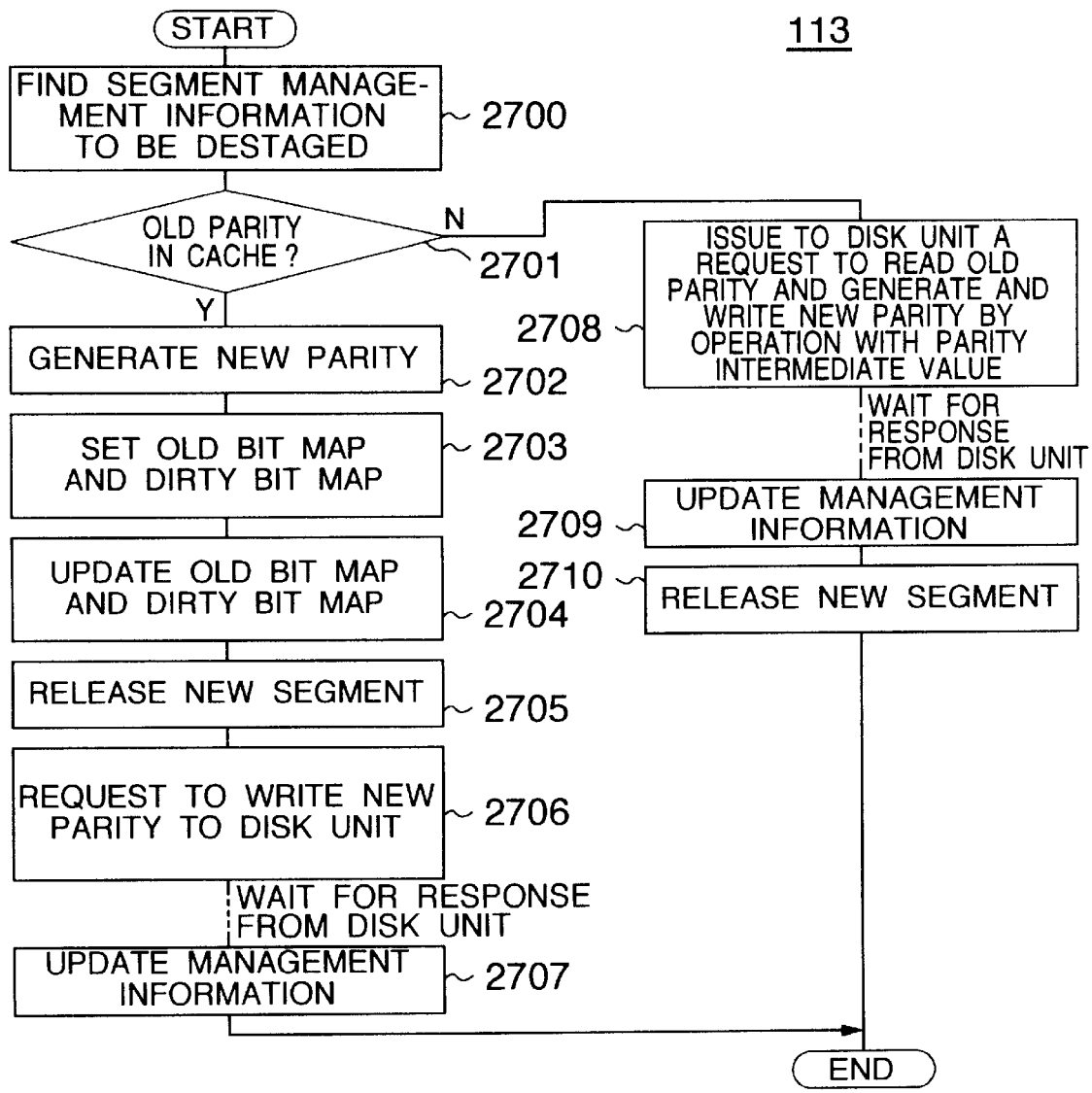
FIG. 27 shows a process flow of a parity destaging unit.

FIG. 27 shows a process flow of the parity destaging unit 113 in the control unit 1305. In step 2700, the parity destaging unit 113 searches the segment management information 2103 to recognize whether the parity record 1702 to be destaged is present or not. Specifically, the parity data destaging unit 113 finds the segment management information 2103 allocated to the logical parity stripe 1614 having the new bit map 2503 set. If it is found, the following process is executed.

In step 2701, the parity destaging unit 113 checks whether the old value of the parity record 1702 is present in the cache 1308 or not. Specifically, the parity data destaging unit 113 checks whether the old bit map 2504 corresponding to the parity record 1702 having the new bit map 2502 set is set or not. If it is not present, the process jumps to step 2707. If it is present, the generation process of the new parity 104 is started in the steps 2702 and the following steps. In step 2702, the new parity 104 is generated from the parity intermediate value 102 and the old parity 103 and it is stored in the cache 1308 and the non-volatile memory 1400. In step 2703, the corresponding old bit map 2503 and old dirty bit map 2504 are set.

In step 2704, the new dirty bit map 2503 and the new bit map 2502 are turned off. In step 2705, the segment 2000 pointed by the old segment pointer 2500 is made empty and the old segment pointer 2500 is made null.

The process of steps 2703~2705 is executed for not only the cache 1308 and the directory 1309 but also the non-volatile memory 1400 and the non-volatile memory 1401.

Then, in step 2706, the parity destaging unit 113 issues a request to write the new parity 104 in the disk unit 1304. This request has the same content as that when the data destaging unit 111 writes the new data 101 in the disk unit 1304. Specifically, it is executed in the same manner as that of the write request to the disk unit 1304 of the new data 100 shown in FIGS. 16~18. Accordingly, for this request, the data write unit 112 of the disk unit 1304 is operated. The process content of the data write unit 112 is as shown in the process flow of FIG. 24.

The parity destaging unit 113 then completes the process to wait the completion of the destage request.

When the parity destaging unit 113 receives the notice of completion of the write request from the disk unit 1304, it restarts the process. In step 2707, the old dirty segment bit map 2505 of the corresponding segment management information 2103 is turned off. When the mapping information 2100 is managed by the control unit 1305, the mapping information 2100 is updated in accordance with the physical record 1502 for which the writing is made. Thus, the process is competed.

On the other hand, in step 2701, if the old parity 103 is not present in the cache 1308, whether the segment 2000 for storing the old data 101 is allocated or not is checked in step 2708, and if it is not allocated, the segment 2000 is allocated. Specifically, the old segment pointer 2501 points the allocated segment 2000.

Figure 28:
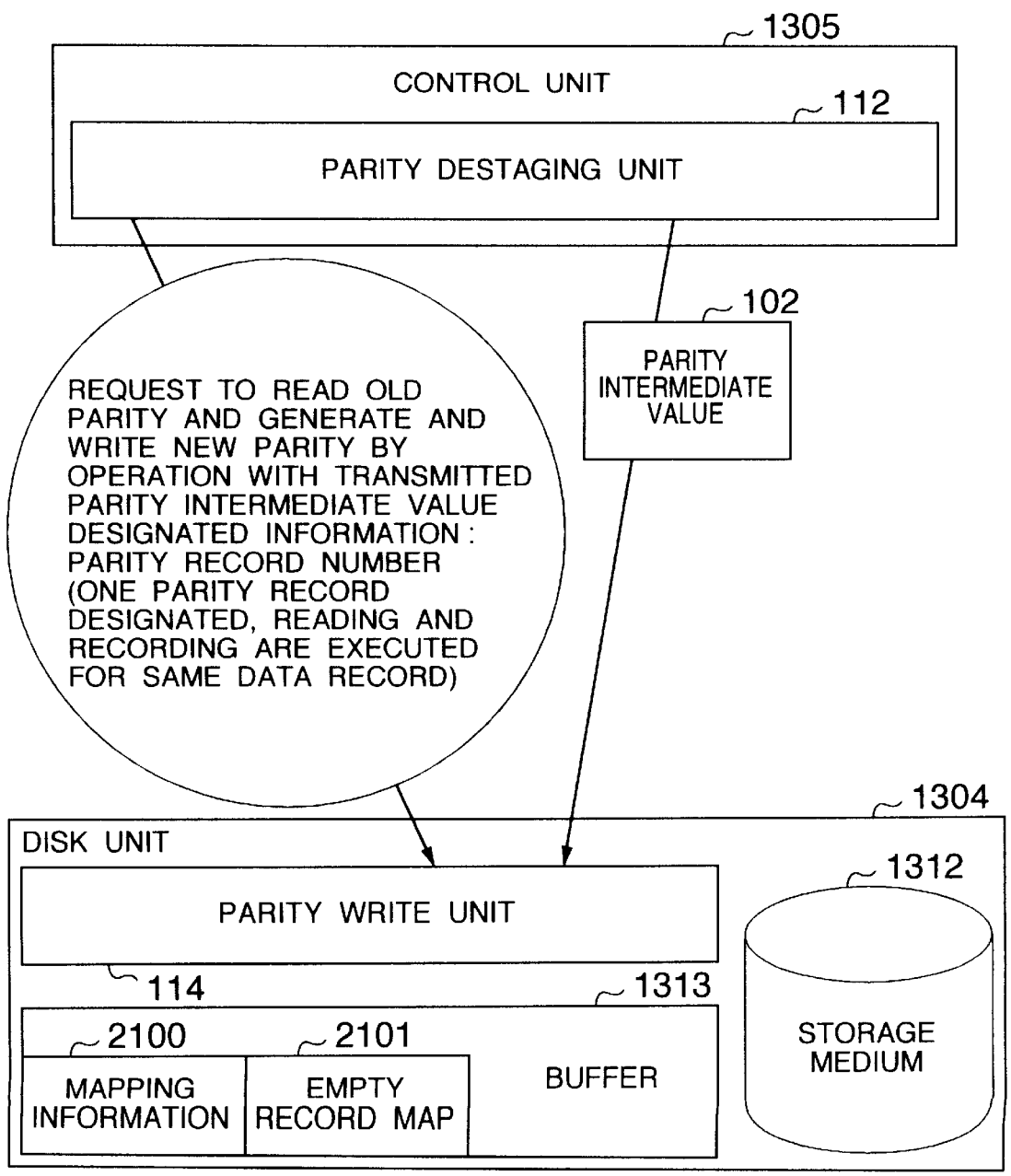
FIG. 28 shows a conceptual view of function distribution between the control unit and the disk unit in reading the old parity, generating the new parity and writing the new parity when the mapping function is allocated to the disk unit.

Then, in step 2708, the parity destaging unit 113 requests to the disk unit 1304 to read the old data 101 from the physical data record 1500 corresponding to the old parity 103, generates the new parity 104 from the parity intermediate value 102 received from the control unit 1305 and the old parity 103, and writes the new parity 104 in the empty record 1503. In this case, the content of the request issued by the parity destaging unit depends on the function distribution between the control unit 1305 and the disk unit 1304. In the first case, the conversion of the logical stripe 1611 and the physical stripe 1612 is executed by the disk unit 1305. In this case, as shown in FIG. 28, the parity destaging unit 113 designates the parity record 1701 to be read from and written into and sends the parity intermediate value 102. The disk unit 1304 reads the old parity 102 from the corresponding physical parity record 1501, generates the new parity 104 and writes the new parity 104 in the first found empty record 1502.

In the second case, the conversion of the logical stripe 1611 and the physical stripe 1612 is executed by the control unit 1305. In this case, two further methods are possible. In a method shown in FIG. 29, the control unit 1305 informs the physical record 1502 in which the old parity 103 is stored, that is, the physical record 1502 to be read from and all empty records 1503 in the physical stripe 1613, that is, one or more physical records 1502 as a candidate to be written into. The disk unit 1304 reads the old parity 103 from the designated physical record 1502, generates the new parity 104 and writes the new parity 104 in the first found physical record 1502 of the designated physical records 1502.

Figure 30:
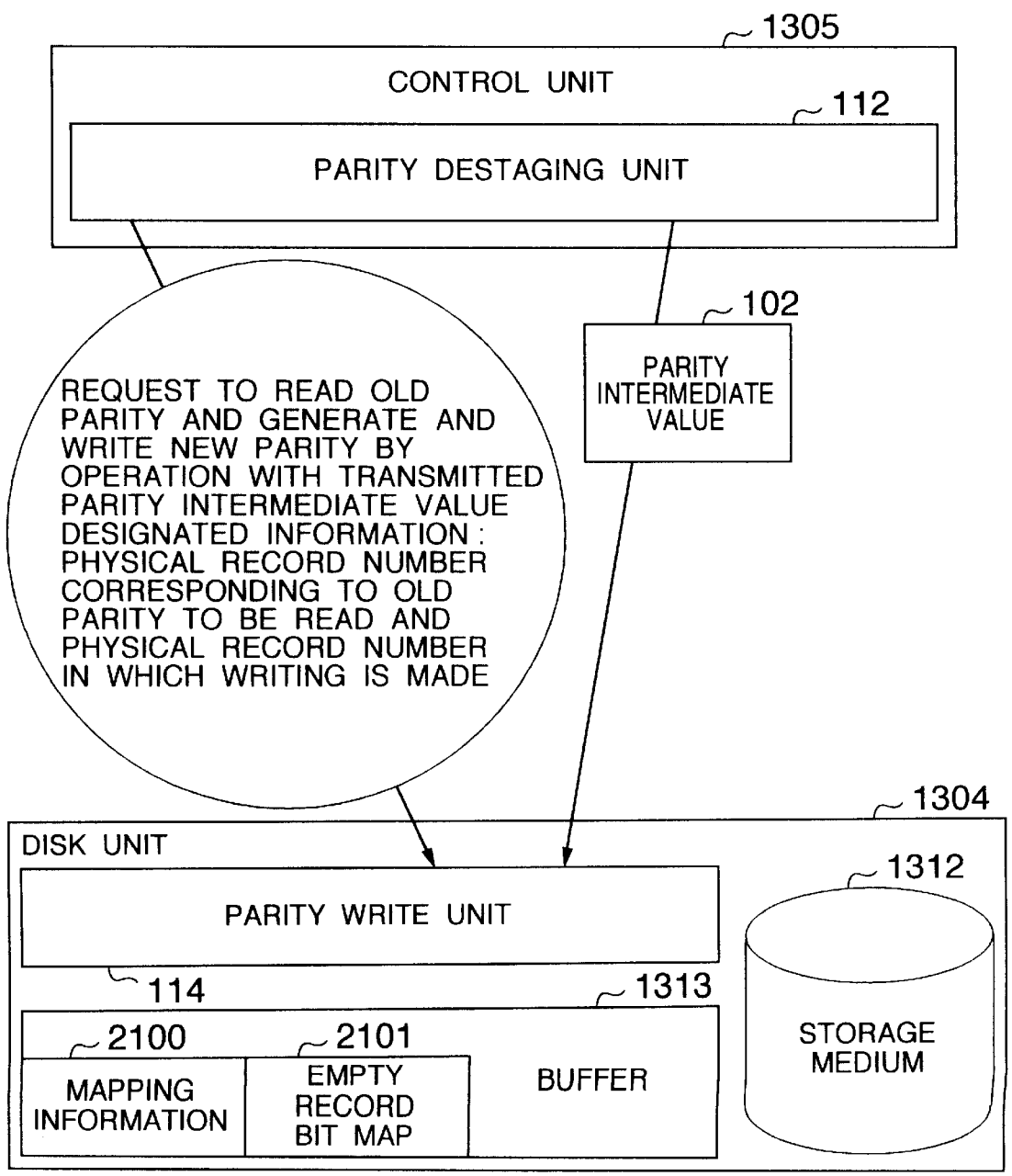
FIG. 30 shows a conceptual view of function distribution between the control unit and the disk unit in reading the old parity, generating the new parity and writing the new parity when the mapping function is allocated to the control unit.

In a method shown in FIG. 30, the control unit 1305 directly designates the physical record 1502 to which the new parity 104 is to be written into. The control unit 1305 selects the closest empty record 1503 as the physical record 1502 in which the data is to be written after the generation of the new parity 104 while taking the time from the reading of the old parity 103 to the generation of the new parity 104 into consideration. When the disk unit 1304 can parallelly execute the reading of the old parity 103 and the generation of the new parity 104, the control unit 1305 may select the closest empty record 1503 following to the physical record 1502 for which the reading is made. After that, the parity destaging unit 113 completes the process to wait the completion of the destage request including the parity generation.

When the data destaging unit 113 receives the notice of completion of the destage request form the disk unit 1304, it restarts the process. In step 2709, the old dirty bit map 2505 and the old bit map 2504 of the corresponding segment management information 2103 of the directory 1309 and the non-volatile memory management information are turned off. Further, in step 2710, the segment pointed by the old segment pointer 2501 is made empty and the old segment pointer 2501 is made null. When the mapping information 2100 is managed by the control unit 1305, the mapping information 2100 is updated in accordance with the physical record for which the writing is made. Thus, the process is completed.

Figure 31:
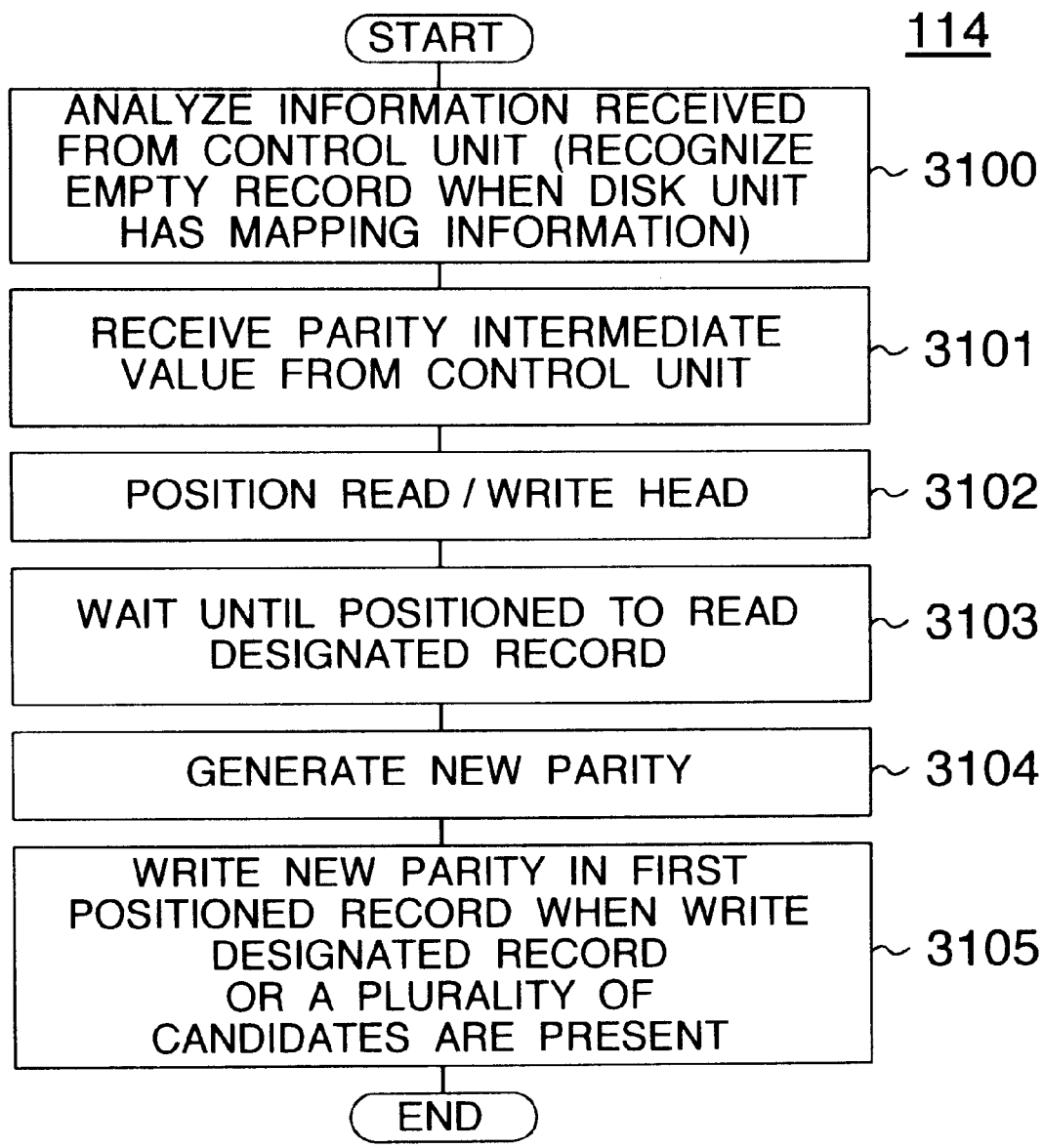
FIG. 31 shows a process flow chart of a parity write unit.

FIG. 31 shows a process flow of the parity write unit 114 in the disk unit 1304. First, in step 3100, the information received from the control unit 1305 is analyzed. When the mapping information 2100 is managed by the disk unit 1304, the empty records 1503 of the related logical stripes 1611 are recognized. In step 3011, the parity intermediate value 102 is received from the control unit 1305.

In a step 3102, the positioning of the read/write head 1413 is executed, and in step 3103, the process waits until the read/write head 1413 is positioned to the physical record 1502 to be read from.

In a step 3104, the old parity 103 is read from the positioned physical record 1502 and the new parity 104 is generated from the read physical record 1502 and the parity intermediate value 102. The read process and the generation process of the new parity 104 may be parallelly executed.

In step 3105, the parity write unit 114 writes the new parity 104 in the first found empty record 1503, the first found physical record 1502 of the physical records 1502 designated by the control unit 1305 or the physical record 1502 designated by the control unit 1305. Then, the parity write unit 114 reports the completion of the request to the control unit 1305. When the disk unit 1304 has the mapping information 2100, the mapping information 2100 is updated before the completion report is returned.

In accordance with the embodiment described above, when the updating of the parity record 1702 accompanied with the updating of the data record 1700 is executed, a portion of the generation process of the new parity 1702 can be executed in the disk unit 1304 so that the process load of the control unit 1305 may be reduced to some extent. Further, for the write request from the control unit 1305, since each disk unit 1304 writes the information received from the control unit 1305 or the information which it generates by itself to the empty record 1503 to which the read/write head is first positioned, the response time of the request from the control unit 1304 may be reduced.

In the embodiment described above, the new parity 104 generated by the disk unit 1304 may be sent to the control unit 1305 and stored in the cache 1308 in the control unit 1305. In this case, the generation of the next new parity 104 may be made in the control unit 1305 and the new parity 104 may be written without reading the physical record 1502 from the disk unit 1305.

In the above embodiment, when the parity record 1702 is updated, the control unit 1305 sends the parity intermediate value 102. When the old data 101 is present in the cache 1308, the calculation of the parity intermediate value 102 is executed by the control unit 1305. From the view point of reducing the load of the control unit 1305, it is effective to distribute the calculation load to the disk unit 1305. FIGS. 35A and 35B represent an outline of operation from such a view point. As shown, the parity destaging unit 112 in the control unit 1305 sends the old data 101 and the new data 100 to the parity write unit 114 in the disk unit 1305. The parity destaging unit 114 generates the parity intermediate value 102 from the old data 101 and the new data 100. Then, the old parity 103 is read from the storage medium 1312, the new parity 104 is generated from the read old parity 103 and the parity intermediate value 102, and the new parity 104 is written in the storage medium 1312. Instead, the new parity 104 may be directly generated from the old data 1201 and the new data 100 without generating the parity intermediate value 102.

Figure 29:
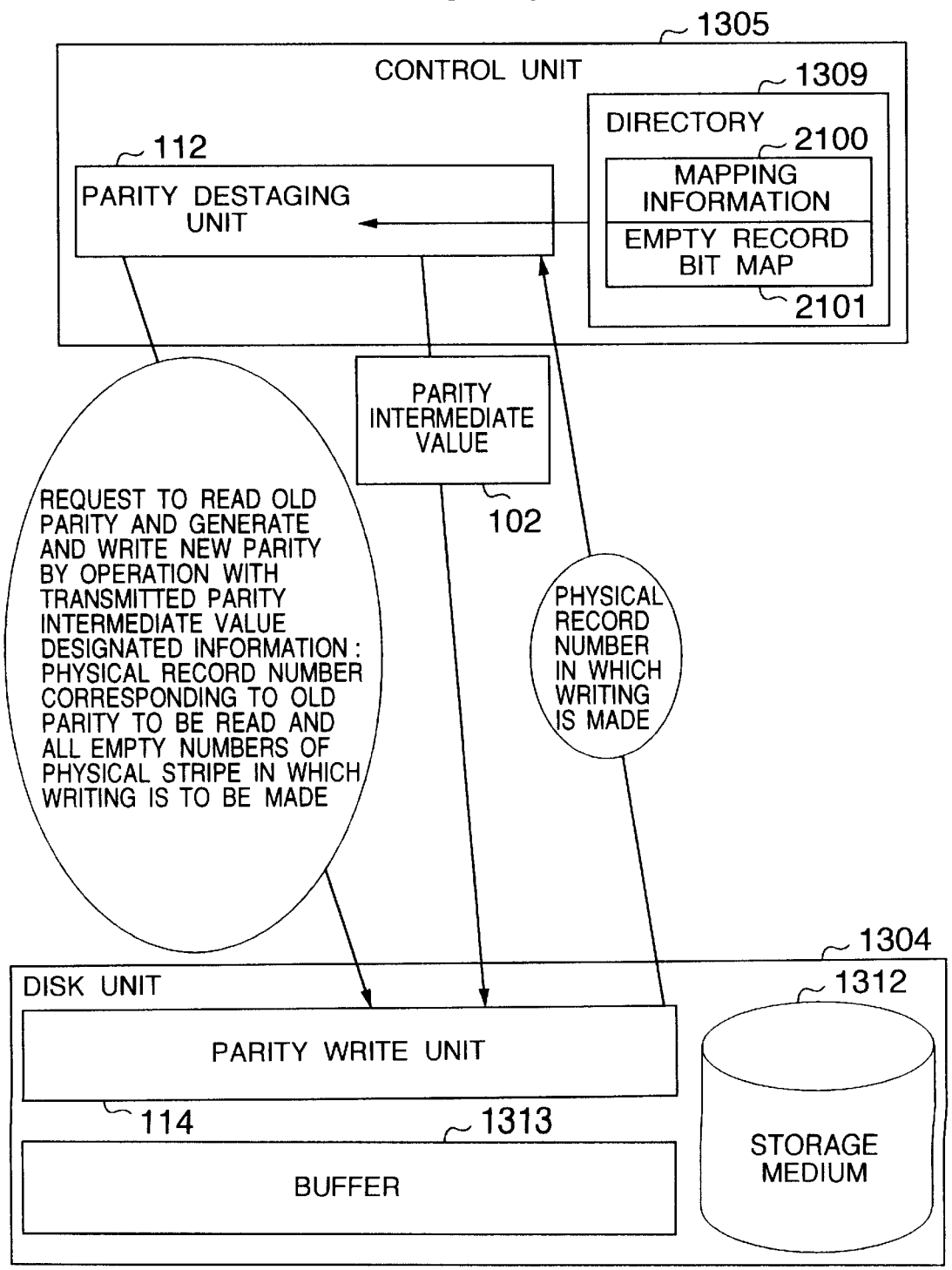
FIG. 29 shows a conceptual view of function distribution between the control unit and the disk unit in reading the old parity, generating the new parity and writing the new parity when the mapping function is allocated to the control unit.

A concept shown in FIGS. 28–30 may be applied as it is for a specific interface of the control unit 1305 and the disk unit 1304. This is summarized in FIGS. 36–39. The differences between FIGS. 28–30 and FIGS. 36–39 are as follows:

(1) The information which the control unit 1305 sends to the disk unit 1304 is changed from the parity intermediate value 102 to the old data 101 and the new data 100.

(2) Two information data, the old data 101 and the new data 100, are sent from the control unit 1305 to the disk unit 1304. The disk unit 1304 generates the new parity 104 from the old data 101, the new data 100, and the old parity 103 and writes it in the storage medium 1312. When the two information data are transmitted separately, the transfer overhead of the control unit 1305 and the disk unit 1304 increases. Thus, it is desirable to transmit the two information data collectively. When the control unit 1305 transmits the information, the designated information length may be a sum of the length of the old data 101 and the length of the new data 100 or it may be set to the length of the new parity to be written in the disk unit 1305 (equal to the length of the old data 101 or the new data 100). A method of sending the old data 101 and the new data 100 from the control unit 1304 to the disk unit 1305 which stores the parity record 702 may be applied to the case shown in FIG. 39. Specifically, it is the case when the new parity 104 is to be always written in the physical record 1502 from which the old parity 103 is read, that is, when the parity record 1702 is always stored in the same physical record 1502. The effect of this case is to reduce the load of the control unit 1305.

Figure 32:
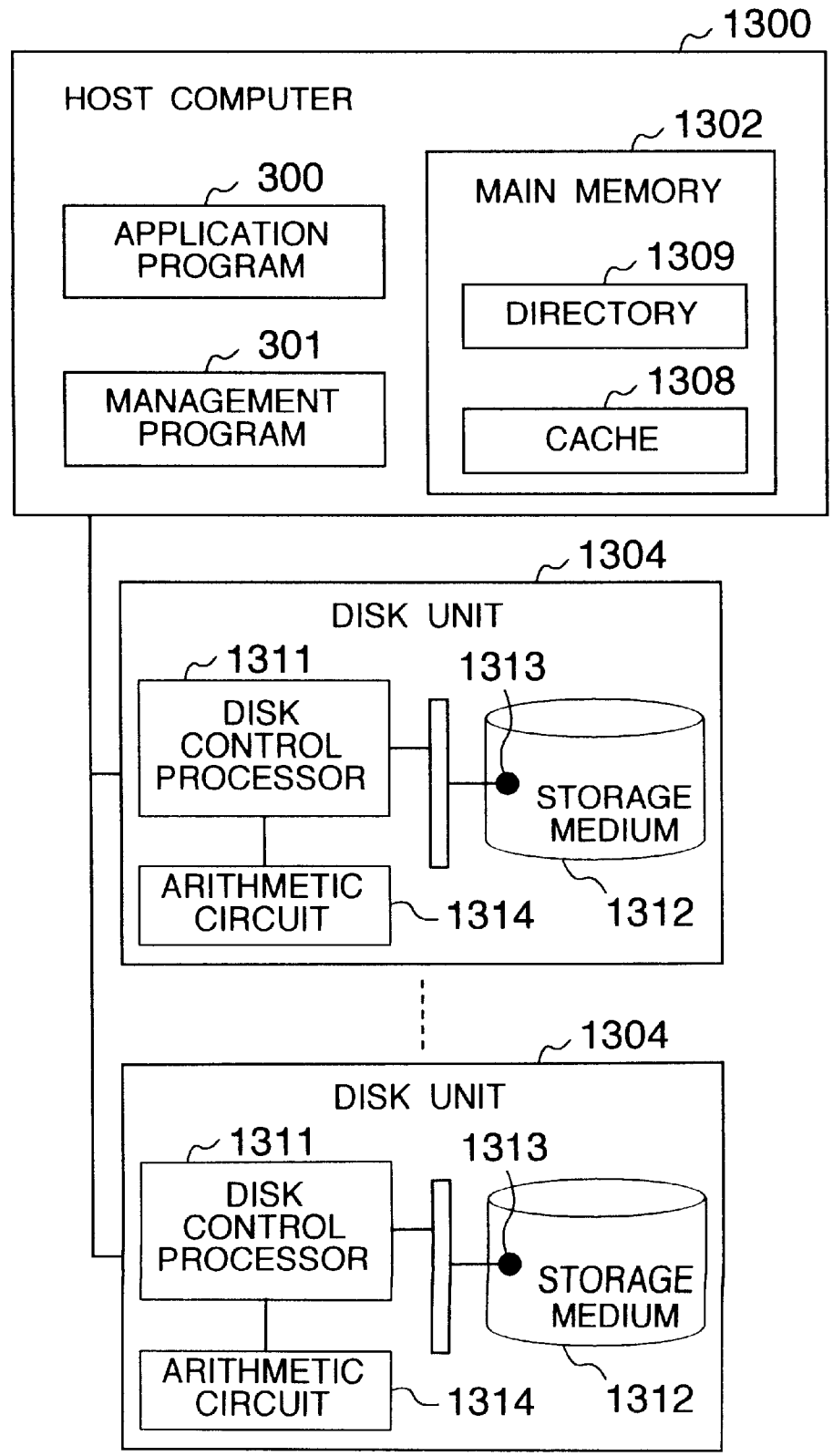
FIG. 32 shows a block diagram of a configuration of a computer system in accordance with a second embodiment.

A second embodiment is now explained. FIG. 32 shows a block diagram of a computer system in accordance with the second embodiment. A difference in configuration from the computer system of the first embodiment resides in that the disk unit 1304 is directly connected to the host computer 1300. In the present embodiment, the cache 1308 and the directory 1309 are realized on the main memory 1302 of the host computer 1300. The main memory 1302 of the host computer 1300 may be non-volatile or volatile. An application program 300 and a management program 301 are executed on the host computer 1300. The management program 301 has the management function for the cache 1308, the directory 1309. In the present embodiment, the application program 300 directly reads and writes the data record 1700. Namely, in the present embodiment, it may be considered that the application program 300 corresponds to host computer 1300 of FIG. 2 in the first embodiment and management program 301 corresponds to the control unit 1305 of FIG. 2. Accordingly, the components for realizing the functions provided in the control unit 1305 in FIG. 1 are provided in the management program 301. Accordingly, the explanation of the functions of the components realized in the management program 301 is omitted. The detailed contents thereof are same as those described in the first embodiment and the explanation thereof is omitted.

Figure 33:
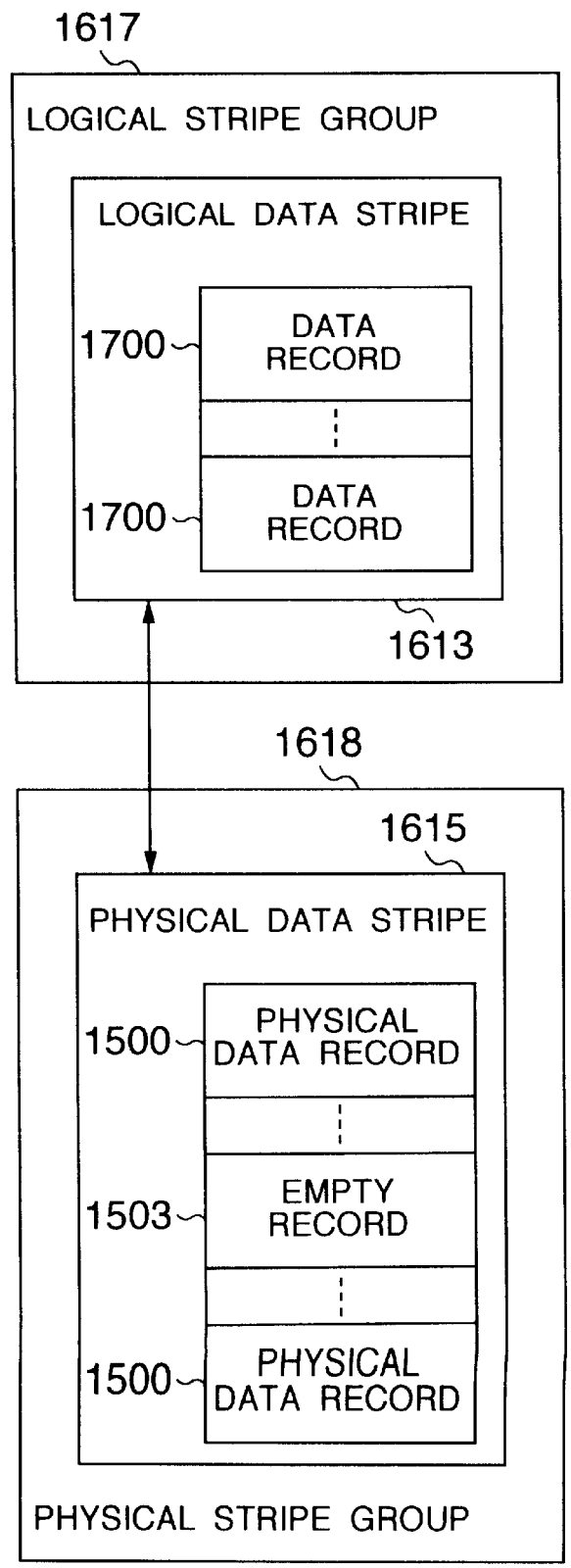
FIG. 33 shows a conceptual views of a structure of stripe when no parity record is included.

In the first and second embodiments described above, n parity records 1702 are generated for m data records 1700. The present invention is also effective when no parity record 1702 is provided. In this case, the relation between the logical stripe group 1611 and the physical stripe group 1612 is as shown in FIG. 33. In this case, the data record write unit 111 requests the new data 100 to the disk unit 1304. The disk unit 1304 writes the new data 100 in the first positioned physical record 1502 of the physical data record 1500 in which the old data 101 is stored, and the empty records 1503 in the corresponding physical data stripe 1615. Thus, the access time of the disk unit may be reduced. The interface of the control unit 1305 and the disk unit may be one of those shown in FIGS. 17 and 18.

Figure 34:
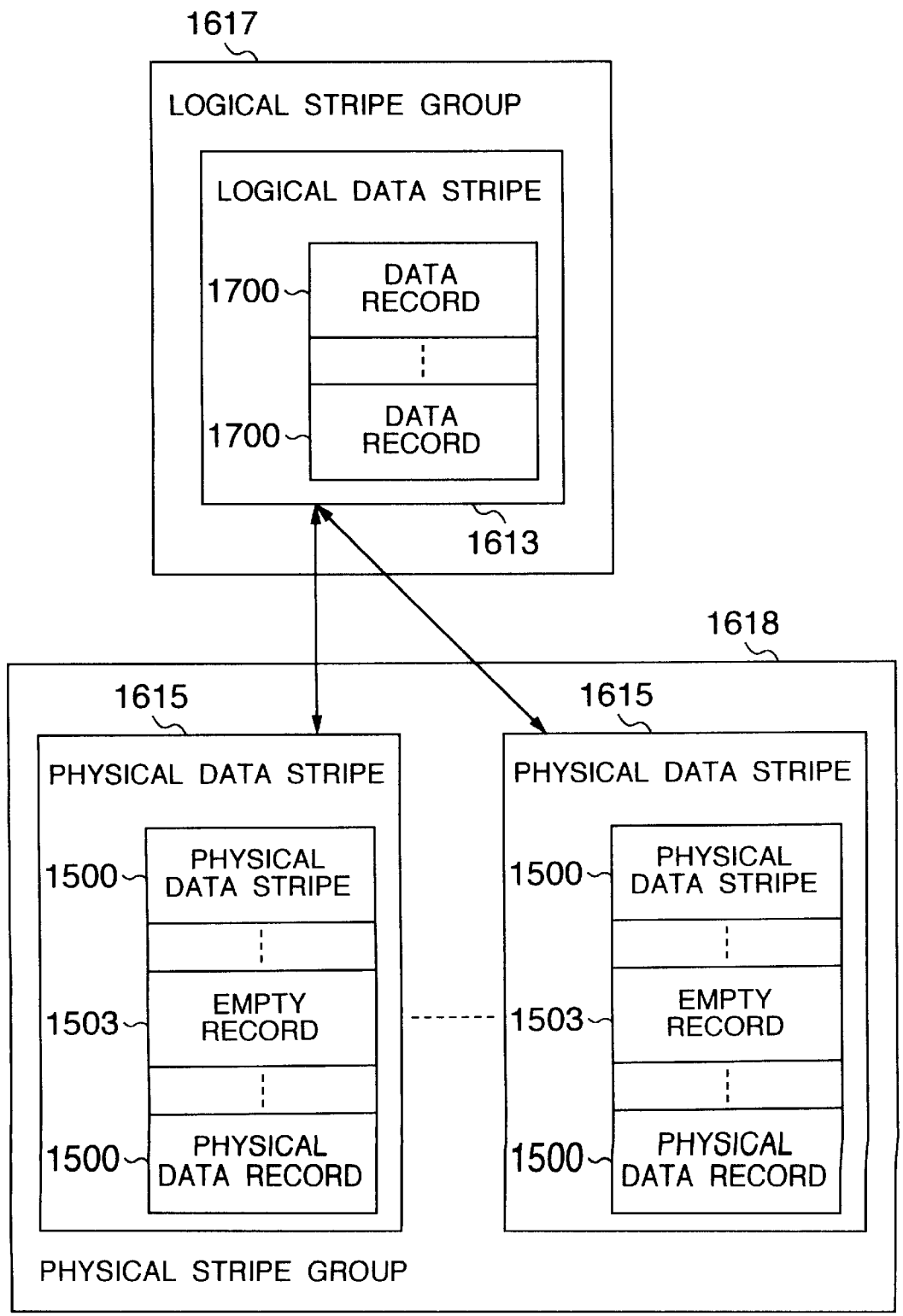
FIG. 34 shows a conceptual view of a structure of stripe when a data record is written into two or more physical records.

On the other hand, the present invention is also effective when one data record 1700 is to be written in two or more physical records 1502, as shown in FIG. 34. FIG. 34 shows a relation of the logical stripe group 1611 and the physical stripe group 1612 of this case. In this case, the disk unit 1304 also writes the new data 100 in the first positioned physical record 1502 of the physical data record 1502 which the old data 101 is stored in and the empty records 1503 in the corresponding physical data stripe 1615. Thus, the access time of the disk unit 1304 may be reduced. The interface between the control unit 1305 and the disk unit may be one of those shown in FIGS. 17 and 18.

What is claimed is:

1. A storage unit suitable for a storage unit subsystem comprising a plurality of storage units and a control unit for controlling said storage units, wherein each data group is formed by m (m≧1) ordinary data and n(n≧1) redundant data for recovering said ordinary data, said ordinary data and said redundant data in each data group are stored in storage media on different storage units, respectively, as records, and each record is capable of assuming a state to store said ordinary data or said redundant data and a state not to store any of said ordinary data or said redundant data, and said plurality of storage units include a plurality of records belonging to a plurality of said data groups, said storage unit comprising:

means for receiving information for generating said redundant data from said control unit;

means for reading information for generating said redundant data from a record designated from said control unit;

means for generating said redundant data from the information received from said control unit and the information read from said record designated from said control unit; and means for writing generated redundant data in a record.

2. A storage unit according to claim 1, further comprising means for informing said control unit the record in which said redundant data is written.

3. A storage unit subsystem, comprising:

plurality of storage units;

a control unit for controlling said storage units, wherein each data group is formed by m (m≧1) ordinary data and n (n≧1) redundant data for recovering said ordinary data, the ordinary data and the redundant data in each data group are stored on record media of different storage units, respectively, as records, each record being capable of assuming a state to store said ordinary data or said redundant data and a state not to store any of said ordinary data or said redundant data, and said plurality of storage units include plurality of records belonging to a plurality of said data groups;

said control unit comprising means for holding information for identifying whether a record is in the state to store said ordinary data or said redundant data or in the state not to store any of said ordinary data or said redundant data, means for sending information for generating said redundant data, an address of a record in which the information for generating said redundant data is stored and a plurality of candidates for a record in which said redundant data is to be written, to said storage unit, and means for receiving from said storage unit an address of the record in which the redundant data has been written; and said storage unit comprising means for receiving from said control unit the information for generating said redundant data, the address of the record in which the information for generating said redundant data is stored and the plurality of candidates for the record in which said redundant data is to be written, means for reading the information for generating said redundant data from a record designated from said control unit, means for generating said redundant data from the information received from said control unit and the information read from the record designated from said control unit, means for selecting a record in which generated redundant data is to be written from said plurality of candidates for the record in which said redundant data received from said control unit is to be written and writing generated redundant data in a selected record, and means for informing said control unit the selected record in which said redundant data is written.

4. A storage unit subsystem, comprising:

a plurality of storage units;

a control unit for controlling said storage units, wherein each data group is formed by m (m≧1) ordinary data and n (n≧1) redundant data for recovering said ordinary data, the ordinary data and the redundant data in each data group are stored on record media of different storage units, respectively, as records, each record being capable of assuming a state to store said ordinary data or said redundant data belonging to at least one data group and a state not to store any of said ordinary data or said redundant data, and said plurality of storage units include records belonging to a plurality of said data groups;

said control unit comprising means for holding record storage state information for identifying whether a record is in the state to store said ordinary data or said redundant data or in the state not to store any of said ordinary data or said redundant data and referring said record storage status information for determining a record in which said redundant data is to be stored, and means for sending information for generating said redundant data, an address of a record in which the information for generating said redundant data is stored and a record designated as the record in which said redundant data is to be written, to said storage unit; and said storage unit comprising means for receiving from said control unit the information for generating said redundant data, the address of the record in which the information for generating said redundant data is stored and the record in which said redundant data is to be written, means for reading the information for generating said redundant data from a record designated from said control unit, means for generating said redundant data from the information received from said control unit and the information read from the record designated from said control unit, and means for writing generated redundant data in the record designated from said control unit.

5. A storage unit suitable for a storage unit subsystem comprising a plurality of storage units and a control unit for controlling said storage units, wherein each data group is formed by m (m≧1) ordinary data and n (n≧1) redundant data for recovering said ordinary data, said ordinary data and said redundant data in each data group are stored in storage media on different storage units, respectively, as records, and each record is capable of assuming a state to store said ordinary data or said redundant data belonging to at least one data group and a state not to store any of said ordinary data or said redundant data, and said plurality of storage units include records belonging to a plurality of said record groups, said storage unit comprising:

means for receiving from said control unit an address of a record in which information for generating said redundant data is stored on a storage medium, said ordinary data and a plurality of candidates for a record in which said ordinary data is to be written;

means for reading the information for generating said redundant data from said storage medium and sending the information read from said storage medium to said control unit; and means for selecting a record in which said redundant data is to be written from said plurality of candidates for the record in which said ordinary data is to be written, and writing said ordinary data received from said control unit in a selected record.

6. A storage unit according to claim 5, further comprising means for informing said control unit said record in which said ordinary is written.

7. A storage unit system, comprising:

a plurality of storage units;

a control unit for controlling said storage units, wherein each data group is formed by m (m≧1) ordinary data and n (n≧1) redundant data for recovering said ordinary data, said ordinary data and said redundant data in each data group are stored on record media of different storage units, respectively, as records, each record being capable of assuming a state to store said ordinary data or said redundant data belonging to at least one data group and a state not to store any of said ordinary data or said redundant data, and said plurality of storage units include records belonging to a plurality of said data groups, said control unit comprising means for holding information for identifying whether a record is in the state to store said ordinary data or said redundant data or in the state not to store any of said ordinary data or said redundant data, means for sending an address of a record in which the information for generating said redundant data is stored, said ordinary data and a plurality of candidates for a record in which said ordinary data is to be written, to said storage unit, and means for receiving from said storage unit an address of the record in which the ordinary data has been written; and said storage unit comprising means for receiving from said control unit the address of the record in which the information for generating said redundant data is stored, said ordinary data and said plurality of candidates for the record in which said ordinary data is to be written, means for reading the information for generating said redundant data from a storage medium and sending the information read from said storage medium to said control unit, means for selecting a record in which said redundant data is to be written from said plurality of candidates for the record in which said ordinary data received from said control unit and writing said ordinary data in a selected record, and means for informing to said control unit the selected record in which said ordinary data is written.

8. A storage unit system, comprising:

a plurality of storage units;

a control unit for controlling said storage units, wherein each data group is formed by m (m≧1) ordinary data and n (n≧1) redundant data for recovering said ordinary data, the ordinary data and the redundant data in each data group are stored on record media of different storage units, respectively, as records, each record being capable of assuming a state to store said ordinary data or said redundant data belonging to at least one data group and a state not to store any of said ordinary data or said redundant data, and said plurality of storage units include records belonging a plurality of said record groups, said control unit comprising determination means for holding record storage state information for identifying whether a record is in the state to store said ordinary data or said redundant data or in the state not to store any of said ordinary data or said redundant data and referring said record storage status information for determining a record in which said redundant data is to be stored, and means for sending an address of a record in which the information for generating said redundant data is stored, said ordinary data and a record designated as the record in which said ordinary data is to be written, to said storage unit; and said storage unit comprising means for receiving from said control unit the address of the record in which the information for generating said redundant data is stored, said ordinary data and the record designated as the record in which said ordinary data is to be written, means for reading the information for generating said redundant data from a storage medium and sending the information read from said storage medium to said control unit, means for generating said redundant data from the information for generating said redundant data, and means for writing said ordinary data in the record designated from said control unit.

9. A storage unit system according to claim 8, further comprising:

means provided in said storage unit for sending to said control unit position information representing a position on said record medium of a read/write head for reading and writing data to from and to said storage medium; and means provided in said control [means] unit for receiving said position information from said storage unit;

said determination means determining a record in which said ordinary data is to be stored based on the record storage status information and the position information.

10. A storage unit suitable for a storage unit subsystem comprising a plurality of storage units and a control unit for controlling said storage units, wherein each data group is formed by m (m≧1) ordinary data and n (n≧1) redundant data for recovering said ordinary data, said ordinary data and said redundant data in each data group are stored in storage media on different storage units, respectively, as records, and each record is capable of assuming a state to store said ordinary data or said redundant data belonging to at least one data group and a state not to store any of said ordinary data or said redundant data, and said plurality of storage units include records belonging to a plurality of said data groups, said storage unit comprising:

means for receiving said ordinary data or said redundant data from said control unit;

means for writing said redundant data or said ordinary data received from said control unit in a record; and means for informing said control unit an address of the record in which said redundant data or said ordinary data has been written.

11. A storage unit according to claim 10, wherein said control unit comprises means for holding record storage information for identifying whether said record is in the state to store said ordinary data or said redundant data or in the state not to store any of said ordinary data or said redundant data, wherein said storage unit refers said record storage information to determine the record in which said ordinary data or said redundant data is to be written.

12. A storage unit system comprising a plurality of storage units and a control unit for controlling said storage units, wherein each data group is formed by m (m≧1) ordinary data and n (n≧1) redundant data for recovering said ordinary data, the ordinary data and the redundant data in each data group are stored on record media of different storage units, respectively, as records for storing units, said record being capable of assuming a state to store said ordinary data or said redundant data belonging to at least one data group and a state not to store any of said ordinary data or said redundant data, said control unit comprising means for holding information for identifying whether said record is in the state to store said ordinary data or said redundant data or in the state not to store any of said ordinary data or said redundant data, means for sending a plurality of candidates for a record in which said redundant data or said ordinary data is to be written and said redundant data or said ordinary data, to said storage unit, and means for receiving from said storage unit an address of the record in which said redundant data or said ordinary data has actually been written; and said storage unit comprising means for receiving from said control unit the plurality of candidate for the record in which said redundant data or said ordinary data is to be written and said redundant data or said ordinary data, means for storing said redundant data or said ordinary data in the record so far no stored any of said ordinary data or said redundant data, and means for sending to said control unit an address of the record in which said redundant data or said ordinary data has actually been written.

13. A storage unit system comprising a plurality of storage units and a control unit for controlling said storage units, wherein each data group is formed by m (m≧1) ordinary data and n (n≧1) redundant data for recovering said ordinary data, the ordinary data and the redundant data in each data group are stored on record media of different storage units, respectively, as records for storing units, said record being capable of assuming a state to store said ordinary data or said redundant data belonging to at least one data group and a state not to store any of said ordinary data or said redundant data, and said plurality of storage units include records belonging to plurality of said data groups, said control unit comprising means for holding record storage state information for identifying whether said record is in the state to store said ordinary data or said redundant data or in the state not to store any of said ordinary data or said redundant data and receiving from said storage unit position information for representing a position on said storage medium of a read/write head for reading and writing affirmation from and to said storage medium, means for determining a record in which said redundant data or said ordinary data is to be written based on said record storage status information and said position information and means for sending to said storage unit the record in which said redundant data or said ordinary data is to be written and said redundant data or said ordinary data; and said storage unit comprising means for receiving from said control unit the record in which said redundant data or said ordinary data is to be written and means for writing said redundant data or said ordinary data in the record designated from said control unit.

14. A storage unit suitable for a computer system comprising a plurality storage units and a host computer, wherein each data group is formed by m (m≧1) ordinary data and n (n≧1) redundant data for recovering said ordinary data in storage media on a different storage, respectively, as records, and each record is capable of assuming a state to store said ordinary data or said redundant data belonging to at least one data group and a state not to store any of said ordinary data or said redundant data, and said plurality of storage units include records belonging to a plurality of said data group, said storage unit comprising:

means for receiving information for generating said redundant data from said host computer;

means for reading information for generating said redundant data from a record designated from said host computer;

means for generating said redundant data from the information received from said host computer and the information read from the record designated from said host computer; and means for writing generated redundant data in a record.

15. A storage unit according to claim 14, further comprising means for informing said host computer the record in which said redundant data has been written.

16. A computer system, comprising:

a plurality storage units;

a host computer, wherein each data group is formed by m (m≧1) ordinary data and n (n≧1) redundant data for recovering said ordinary data, said ordinary data and said redundant data in each group are stored in different storage units, respectively, as records, and each record is capable of assuming a state to store said ordinary data or said redundant data belonging to at least one data group and a state not to store any of said ordinary data or said redundant data, said plurality of storage units include records belonging to a plurality of said data groups;

said host computer comprising means for holding information for identifying whether a record is in a state to store said ordinary data or said redundant data or in a state not to store any of said ordinary data or said redundant data, means for sending to said control unit the information for generating said redundant data, an address in which the information for generating said redundant data is stored and a plurality of candidates for a record in which said redundant data is to be written, and means for receiving an address of the record in which said redundant data has been written from said storage unit; and said control unit comprising means for receiving the information for generating said redundant data, the address of the record in which the information for generating said redundant data is stored and the plurality of candidates for the record in which said redundant data is to be written from said host computer, means for reading the information for generating said redundant data from a record designated from said host computer, means for generating said redundant data from the information received from said host computer and the information read from the record designated from said host computer, means for selecting the record in which generated redundant data is to be actually written from the plurality of candidates for the record in which said redundant data received from said host computer is to be written and writing generated redundant data in a selected record, and means for informing said host computer the selected record in which said redundant data has been written.

17. A computer system comprising:

a plurality of storage units;

a host computer, wherein each data group is formed by m ($\geq 1$) ordinary data and n ($\geq 1$) redundant data for recovering said ordinary data, and said ordinary data and said redundant data in each data group are stored in different storage units, respectively, as records, and each record is capable of assuming a state to store said ordinary data or said redundant data belonging to at least one data group and a state not to store any of said ordinary data or said redundant data, and said plurality storage units include records belonging to a plurality of said data groups;

said host computer comprising means for holding record storage status information for identifying whether a record is in a state to store said ordinary data or said redundant data or in a state not to store any of said ordinary data or said redundant data, and determining a record in which said redundant data is to be stored by referring said record storage status information, and means for sending to said control unit the information for generating said redundant data, an address in which the information for generating said redundant data is stored and a record designated as the record in which said redundant data is to be written; and said storage unit comprising means for receiving the information for generating said redundant data, the address of the record in which the information for generating said redundant data is stored and the record in which said redundant data is to be written from said host computer, means for reading the information for generating said redundant data from a record designated from said host computer, means for generating said redundant data from the information received by said host computer, and means for writing generated redundant data in the record designated from said host computer.

18. A storage unit suitable for a computer system comprising a plurality storage units and a host computer, wherein each data group is formed by m ($\geq 1$) ordinary data and n ($\geq 1$) redundant data, and said ordinary data and said redundant data are stored in different storage units, respectively, and records, and each record is capable of assuming a state to store said ordinary data or said redundant data belonging to at least one data group and a state not to store any of said ordinary data or said redundant data, and said plurality of storage units include records belonging to a plurality of said data groups, said storage unit comprising:

means for receiving from said host computer an address of a record in which information for generating said redundant data is stored on a storage medium, said ordinary data and a plurality of candidates for a record in which said ordinary data is to be written on said storage medium;

means for reading information for generating said redundant data from said storage medium and sending the information from said storage medium to said host computer; and means for selecting a record in which said redundant data is to be written from said plurality of candidates for the record in which said ordinary data is to be written, and writing said ordinary data received from said host computer in a selected record.

19. A storage unit according to claim 18, further comprising means for informing said host computer the selected record in which said ordinary data has been written.

20. A computer system comprising:

a plurality storage units;

a host computer, wherein each data group is formed by m ($\geq 1$) ordinary data and n ($\geq 1$) redundant data for recovering said ordinary data, and said ordinary data and said redundant data are stored in different storage units as records, and each record is capable of assuming a state to store said ordinary data or said redundant data belonging to at least one data group and a state not to store any of said ordinary data or said redundant data, and said plurality of storage units include records belonging to a plurality of said data groups;

said host computer comprising determination means for holding information for identifying whether a record is in a state to store said ordinary data or said redundant data or in a state not to store any of said ordinary data or said redundant data, means for sending to said control unit an address in which the information for generating said redundant data is stored, said ordinary data and a plurality of candidates for a record in which said ordinary data is to be written, and means for receiving an address of the record in which said ordinary data has been written from said storage unit; and said storage unit comprising means for receiving the address of the record in which the information for generating said redundant data is stored, said ordinary data and the plurality of candidates for the record in which said ordinary data is to be written from said host computer, means for reading the information for generating said redundant data from a storage medium and sending the information read from said storage medium to said host computer, means for selecting the record in which said redundant data is to be written from the plurality of candidates for the record in which said ordinary data received from said host computer is to be written and writing said ordinary data in a selected record, and means for informing said host computer the selected record in which said ordinary data has been written.

21. A computer system comprising:

a plurality of storage units;

a host computer, wherein each data group is formed by m (≧1) ordinary data and n (≧1) redundant data for recovering said ordinary data, and said ordinary data and said redundant data are stored in different storage units, respectively, as records, and [said] each record is capable of assuming a state to store said ordinary data or said redundant data belonging to at least one data group and a state not to store any of said ordinary data or said redundant data, said plurality of storage units include records belonging to a plurality of said data groups;

said host computer comprising means for holding record storage status information for identifying whether a record is in a state to store said ordinary data or said redundant data or in a state not to store any of said ordinary data or said redundant data and determining a record in which said ordinary data is to be stored by referring said record storage status information, and means for sending to said storage unit an address in which the information for generating said redundant data is stored, said ordinary data and a record designated as the record in which said ordinary data is to be written; and said storage unit comprising means for receiving the address of the record in which the information for generating said redundant data is stored, said ordinary data and the record designated as the record in which said ordinary data is to be written from said host computer, means for reading the information for generating said redundant data from a storage medium and sending the information read from said storage medium to said host computer, means for generating said redundant data from the information for generating said redundant data, and means writing said ordinary data in a record designated from said host computer.

22. A computer system according to claim 21, further comprising:

means provided in said storage unit for sending to said host computer position information representing a position on said record medium of a read/write head for reading and writing data to from and to said storage medium;

means provided in said host computer for receiving said position information from said storage unit; and said determination means determining a record in which said ordinary data is to be stored based on the record storage status information and the position information.

23. A storage unit suitable for a computer system comprising a plurality of storage units and a host computer, wherein each data group is formed by m (≧1) ordinary data and n (≧1) redundant data for recovering said ordinary data, and said ordinary data and said redundant data are stored in different storage units, respectively, as records, and each record is capable of assuming a state to store said ordinary data or said redundant data belonging to at least one data group and a state not to store any of said ordinary data or said redundant data, and said plurality of storage units include records belonging to a plurality of said data groups, said storage unit comprising:

means for receiving from said host computer a plurality of candidates for a record in which said redundant data or said ordinary data is to be written, and said redundant data or said ordinary data;

means for storing said redundant data or said ordinary data in a record; and means for informing said host computer an address of the record in which said redundant data or said ordinary data has been written.

24. A storage unit according to claim 23, wherein said host computer comprises means for holding record storage status information for identifying whether said record is in the state to store said ordinary data or said redundant data or in the state not to store any of said ordinary data or said redundant data, and wherein said storage unit refers said record storage status information to determine the record in which said ordinary data or said redundant data is to be written.

25. A computer system comprising:

a plurality of storage units;

a host computer, wherein each data group is formed by m (≧1) ordinary data and n (≧1) redundant data for recovering said ordinary data, and said ordinary data and said redundant data are stored in different storage units, respectively, and each record is capable of assuming a state to store said ordinary data or said redundant data belonging to at least one data group and a state not to store any of said ordinary data or said redundant data, and said plurality of storage units include records belonging to a plurality of said data groups;

said host computer comprising determination means for holding information for identifying whether said record is in a state to store said ordinary data or said redundant data or in a state not to store any of said ordinary data or said redundant data, means for sending to said control unit a plurality of candidates for a record in which said redundant data or said ordinary data is to be written and said redundant data or said ordinary data, and means for receiving an address of the record in which said redundant data or said ordinary data has been written from said storage unit; and said storage unit comprising means for receiving from said host computer the plurality of candidates for the record in which said redundant data or said ordinary data is to be written and said redundant data or said ordinary data, means for storing said redundant data or said ordinary data in a record, and means for sending to said host computer the address of the record in which said redundant data or said ordinary data has been written.

26. A computer system comprising:

a plurality of storage units;

a host computer, wherein each data group is formed by m (≧1) ordinary data and n (≧1) redundant data for recovering said ordinary data, and said ordinary data and said redundant data are stored in different storage units, respectively, as records, and each record is capable of assuming a state to store said ordinary data or said redundant data belonging to at least one data group and a state not to store any of said ordinary data or said redundant data, and said plurality of storage units include records belonging to a plurality of said data groups;

said host computer comprising means for holding record storage status information for identifying whether a record is in a state to store said ordinary data or said redundant data or in a state not to store any of said ordinary data or said redundant data, and receiving from said storage unit position information representing a position on said storage medium of a read/write head for reading and writing information from and to said storage medium, means for determining a record in which said redundant data or said ordinary data is to be stored from said record storage status information and said position information, and means for sending to said storage unit the record in which said redundant data or said ordinary data is to be written and said redundant data or said ordinary data; and said storage unit comprising means for receiving the record in which said redundant data or said ordinary data is to be written, and said redundant data or said ordinary data from said host computer, and means for writing said redundant data or said ordinary data in a record designated from said host computer.

27. A storage unit having a record as storing unit of data on a storage medium and controlled by a control unit connected to a host computer, wherein said record is capable of assuming a state to store data and not to store, said storage unit comprising:

means for receiving from said control unit data to be written, and a plurality of candidates for a record in which data is to be written;

means for writing data received from said control unit in a record; and means for informing said control unit an address of the record in which said data received from said control unit has been written.

28. A storage unit according to claim 27, wherein said host computer comprises means for holding record storage state information for identifying whether said record is in the state to store data or in the state not to store data, and wherein said storage unit determines the record in which said data received from said control unit is to be written based on said record storage status information.

29. A storage unit system comprising:

a control unit connected to a host computer;

a storage unit controlled by said control unit with a record being storing unit of data on a storage medium, wherein said record is capable of assuming a state to store data and not to store data;

said control unit comprising means for holding record storage status information for identifying whether a record is in the state to store data or in the state not to store data, means for sending to said storage unit a plurality of candidates for a record in which the data is to be written and the data to be written, and means for receiving from said storage unit an address of the record in which the data to be written has been written; and said storage unit comprising means for receiving from said control unit the plurality of candidates for the record in which the data is to be written and the data to be written, means for storing the data to be written in a record, and means for informing said control unit the address of the record in which the data to be written has been written.

30. A storage unit system comprising:

a control unit connected to a host computer;

a storage unit controlled by said control unit with a record being storing unit of data on a storage medium, wherein said record is capable of assuming a state to store data and not to store data;

said control unit comprising means for holding record storage status information for identifying whether said record is in the state to store data or in the state not to store data, means for receiving from said storage unit position information for representing a position on said storage medium of a read/write head for reading and writing data from and to said storage medium, means for determining a record in which the data is to be stored from said record storage status information and said position information, and means for sending to said storage unit the data to be written in said record; and said storage unit comprising means for receiving from said control unit the record in which the data is to be written and the data to be written, means for writing the data in a record designated from said control unit.

31. A storage unit having a record as storing unit of data on a storage medium and controlled by a control unit connected to a host computer, wherein said record is capable of assuming a state to store data and not to store data, said storage unit comprising:

means for receiving data from said host computer;

means for writing the data received from said host computer in a record; and means for informing said host computer an address of the record in which the data received from said control unit has been written.

32. A storage unit according to claim 31, wherein said host computer comprises means for holding record storage state information for identifying whether said record is in the state to store data or in the state not to store data, and wherein said storage unit determines the record in which the data received from said host computer is to be written based on said record storage status information.

33. A computer system comprising a host computer and a storage unit connected to said host computer with a record being storing unit of data on a storage medium, wherein said record is capable of assuming a state to store data and not to store, said host computer comprises means for holding record storage status information for identifying whether said record is in the state to store data or in the state not to store data, means for sending to said storage unit a plurality of candidates for a record in which the data is to be written and means for receiving from said storage unit the address of the record in which the data to be written has actually been written; and said storage unit comprises means for receiving from said storage unit the plurality of candidates for the record in which the data is to be written and the data to be written, means for storing the data to be written in a record so far not stored data and means for informing to said host computer the address of the record in which the data to be written has actually been written.

34. A computer system comprising a host computer and a storage unit connected to said host computer with a record being storing unit of data on a storage medium, wherein said record is capable of assuming a state to store data and not to store, said host computer comprises means for holding record storage status information for identifying whether said record is in the state to store data or in the state not to store data, means for receiving from said storage unit a position information for representing a position on said storage medium of a read/write head for reading and writing data from and to said storage medium, means for determining a record in which the data is to be stored from said record storage status information and said position information, and means for sending to said storage unit the data to be written in said record; and said storage unit comprises means for receiving from said control unit the record in which the data is to be written and the data to be written, means for storing the data to be written in a record designated from said control unit.

* * * * *